United States Patent
Steinwedel et al.

(10) Patent No.: US 11,488,569 B2
(45) Date of Patent: Nov. 1, 2022

(54) AUDIO-VISUAL EFFECTS SYSTEM FOR AUGMENTATION OF CAPTURED PERFORMANCE BASED ON CONTENT THEREOF

(71) Applicant: SMULE, INC., San Francisco, CA (US)

(72) Inventors: David Steinwedel, San Francisco, CA (US); Perry R. Cook, Jacksonville, OR (US); Paul T. Chi, San Jose, CA (US); Wei Zhou, San Francisco, CA (US); Jon Moldover, San Francisco, CA (US); Anton Holmberg, San Francisco, CA (US); Jingxi Li, San Francisco, CA (US)

(73) Assignee: Smule, Inc., San Francisco, CA (US)

( * ) Notice: Subject to any disclaimer, the term of this patent is extended or adjusted under 35 U.S.C. 154(b) by 5 days.

(21) Appl. No.: 16/107,351

(22) Filed: Aug. 21, 2018

(65) Prior Publication Data

US 2018/0374462 A1  Dec. 27, 2018

Related U.S. Application Data

(63) Continuation-in-part of application No. 15/910,646, filed on Mar. 2, 2018, which is a continuation of
(Continued)

(51) Int. Cl.
| | |
|---|---|
| *G10H 1/36* | (2006.01) |
| *G11B 27/02* | (2006.01) |
| *G06T 11/00* | (2006.01) |

(52) U.S. Cl.
CPC .......... *G10H 1/368* (2013.01); *G06T 11/00* (2013.01); *G10H 1/366* (2013.01); *G11B 27/02* (2013.01);
(Continued)

(58) Field of Classification Search
USPC ........................................................ 386/278
See application file for complete search history.

(56) References Cited

U.S. PATENT DOCUMENTS

| | | | |
|---|---|---|---|
| 4,688,464 A | 8/1987 | Gibson et al. | |
| 5,231,671 A | 7/1993 | Gibson et al. | |
(Continued)

FOREIGN PATENT DOCUMENTS

| | | |
|---|---|---|
| CN | 102456340 A | 5/2012 |
| CN | 104580838 A | 4/2015 |
(Continued)

OTHER PUBLICATIONS

PCT International Search Report of International Search Authority for counterpart application, dated Feb. 17, 2016, of PCT/US2015/058373 filed Oct. 30, 2015.
(Continued)

*Primary Examiner* — Daniel T Tekle
(74) *Attorney, Agent, or Firm* — Haynes and Boone, LLP

(57) ABSTRACT

Visual effects schedules are applied to audiovisual performances with differing visual effects applied in correspondence with differing elements of musical structure. Segmentation techniques applied to one or more audio tracks (e.g., vocal or backing tracks) are used to compute some of the components of the musical structure. In some cases, applied visual effects schedules are mood-denominated and may be selected by a performer as a component of his or her visual expression or determined from an audiovisual performance using machine learning techniques.

43 Claims, 11 Drawing Sheets

Related U.S. Application Data application No. 15/173,041, filed on Jun. 3, 2016, now Pat. No. 9,911,403, application No. 16/107,351, which is a continuation-in-part of application No. 15/944,537, filed on Apr. 3, 2018.

(60) Provisional application No. 62/548,122, filed on Aug. 21, 2017, provisional application No. 62/170,255, filed on Jun. 3, 2015, provisional application No. 62/480,610, filed on Apr. 3, 2017.

(52) U.S. Cl.
CPC . *G10H 2210/331* (2013.01); *G10H 2220/005* (2013.01); *G10H 2220/011* (2013.01); *G10H 2220/355* (2013.01); *G10H 2230/015* (2013.01); *G10H 2240/175* (2013.01); *G10H 2240/251* (2013.01)

(56) References Cited

U.S. PATENT DOCUMENTS

| | | | |
|---|---|---|---|
| 5,301,259 A | 4/1994 | Gibson et al. | |
| 5,477,003 A | 12/1995 | Muraki et al. | |
| 5,719,346 A | 2/1998 | Yoshida et al. | |
| 5,811,708 A | 9/1998 | Matsumoto | |
| 5,889,223 A | 3/1999 | Matsumoto | |
| 5,902,950 A | 5/1999 | Kato et al. | |
| 5,939,654 A | 8/1999 | Anada | |
| 5,966,687 A | 10/1999 | Ojard | |
| 6,121,531 A | 9/2000 | Kato | |
| 6,307,140 B1 | 10/2001 | Iwamoto | |
| 6,336,092 B1 | 1/2002 | Gibson et al. | |
| 6,353,174 B1 | 3/2002 | Schmidt et al. | |
| 6,369,311 B1 | 4/2002 | Iwamoto | |
| 6,971,882 B1 | 12/2005 | Kumar et al. | |
| 7,003,496 B2 | 2/2006 | Ishii et al. | |
| 7,068,596 B1 | 6/2006 | Mou | |
| 7,096,080 B2 | 8/2006 | Asada et al. | |
| 7,297,858 B2 | 11/2007 | Paepcke | |
| 7,853,342 B2 | 12/2010 | Redmann | |
| 8,682,653 B2 | 3/2014 | Salazar et al. | |
| 8,868,411 B2 | 10/2014 | Cook et al. | |
| 8,983,829 B2 | 3/2015 | Cook et al. | |
| 8,996,364 B2 | 3/2015 | Cook et al. | |
| 9,058,797 B2 | 6/2015 | Salazar et al. | |
| 9,147,385 B2 | 9/2015 | Salazar et al. | |
| 9,324,330 B2 | 4/2016 | Chordia et al. | |
| 9,601,127 B2 | 3/2017 | Yang et al. | |
| 9,866,731 B2 | 1/2018 | Godfrey et al. | |
| 9,911,403 B2 | 3/2018 | Sung et al. | |
| 2002/0004191 A1 | 1/2002 | Tice et al. | |
| 2002/0032728 A1 | 3/2002 | Sako et al. | |
| 2002/0051119 A1 | 5/2002 | Sherman et al. | |
| 2002/0056117 A1 | 5/2002 | Hasegawa et al. | |
| 2002/0082731 A1 | 6/2002 | Pitman et al. | |
| 2002/0091847 A1 | 7/2002 | Curtin | |
| 2002/0177994 A1 | 11/2002 | Chang et al. | |
| 2003/0014262 A1 | 1/2003 | Kim | |
| 2003/0099347 A1 | 5/2003 | Ford et al. | |
| 2003/0100965 A1 | 5/2003 | Sitrick et al. | |
| 2003/0117531 A1 | 6/2003 | Rovner et al. | |
| 2003/0164924 A1 | 9/2003 | Sherman et al. | |
| 2004/0159215 A1 | 8/2004 | Tohgi et al. | |
| 2004/0263664 A1 | 12/2004 | Aratani et al. | |
| 2005/0120865 A1 | 6/2005 | Tada | |
| 2005/0123887 A1 | 6/2005 | Joung et al. | |
| 2005/0252362 A1 | 11/2005 | McHale et al. | |
| 2006/0165240 A1 | 7/2006 | Bloom et al. | |
| 2006/0206582 A1 | 9/2006 | Finn | |
| 2007/0065794 A1 | 3/2007 | Mangum | |
| 2007/0140510 A1 | 6/2007 | Redmann | |
| 2007/0150082 A1 | 6/2007 | Yang et al. | |
| 2007/0245881 A1 | 10/2007 | Egozy et al. | |
| 2007/0245882 A1 | 10/2007 | Odenwalk | |
| 2007/0250323 A1 | 10/2007 | Dimkovic et al. | |
| 2007/0260690 A1 | 11/2007 | Coleman | |
| 2007/0287141 A1 | 12/2007 | Milner | |
| 2007/0294374 A1 | 12/2007 | Tamori | |
| 2008/0026690 A1* | 1/2008 | Foxenland | H04M 1/72427 455/3.06 |
| 2008/0033585 A1 | 2/2008 | Zopf | |
| 2008/0105109 A1 | 5/2008 | Li et al. | |
| 2008/0156178 A1 | 7/2008 | Georges et al. | |
| 2008/0190271 A1 | 8/2008 | Taub et al. | |
| 2008/0267443 A1* | 10/2008 | Aarabi | G06K 9/00248 382/100 |
| 2008/0270541 A1 | 10/2008 | Keener et al. | |
| 2008/0312914 A1 | 12/2008 | Rajendran et al. | |
| 2009/0003659 A1 | 1/2009 | Forstall et al. | |
| 2009/0038467 A1 | 2/2009 | Brennan | |
| 2009/0106429 A1 | 4/2009 | Siegal et al. | |
| 2009/0107320 A1 | 4/2009 | Willacy et al. | |
| 2009/0165634 A1 | 7/2009 | Mahowald | |
| 2009/0191521 A1* | 7/2009 | Paul | G10L 17/16 434/169 |
| 2010/0126331 A1 | 5/2010 | Golovkin et al. | |
| 2010/0142926 A1 | 6/2010 | Coleman | |
| 2010/0157016 A1 | 6/2010 | Sylvain | |
| 2010/0087240 A1 | 8/2010 | Egozy et al. | |
| 2010/0192753 A1 | 8/2010 | Gao et al. | |
| 2010/0203491 A1 | 8/2010 | Yoon | |
| 2010/0326256 A1 | 12/2010 | Emmerson | |
| 2010/0332222 A1* | 12/2010 | Bai | G10L 17/18 704/214 |
| 2011/0126103 A1* | 5/2011 | Cohen | G11B 27/34 715/716 |
| 2011/0144981 A1* | 6/2011 | Salazar | G10H 1/368 704/207 |
| 2011/0144982 A1 | 6/2011 | Salazar et al. | |
| 2011/0144983 A1 | 6/2011 | Salazar et al. | |
| 2011/0154197 A1 | 6/2011 | Hawthorne et al. | |
| 2011/0251841 A1 | 10/2011 | Cook et al. | |
| 2011/0251842 A1 | 10/2011 | Cook et al. | |
| 2013/0006625 A1 | 1/2013 | Gunatilake et al. | |
| 2013/0254231 A1 | 9/2013 | Decker et al. | |
| 2014/0007147 A1 | 1/2014 | Anderson | |
| 2014/0229831 A1 | 8/2014 | Chordia et al. | |
| 2014/0282748 A1 | 9/2014 | McNamee et al. | |
| 2014/0290465 A1 | 10/2014 | Salazar et al. | |
| 2015/0201161 A1 | 7/2015 | Lachapelle | |
| 2015/0279427 A1 | 10/2015 | Godfrey et al. | |
| 2016/0057316 A1 | 2/2016 | Godfrey et al. | |
| 2016/0358595 A1 | 12/2016 | Sung et al. | |

FOREIGN PATENT DOCUMENTS

| | | |
|---|---|---|
| CN | 108040497 A | 5/2018 |
| EP | 1065651 | 1/2001 |
| EP | 2018058 | 1/2009 |
| GB | 2554322 | 3/2018 |
| JP | 2006-047754 | 2/2006 |
| JP | 2006-311079 | 11/2006 |
| JP | 2010-060627 | 3/2010 |
| JP | 2016206575 | 12/2016 |
| KR | 10-2014-0023665 | 2/2014 |
| KR | 10-2015-0033757 | 4/2015 |
| WO | WO2003030143 | 4/2003 |
| WO | WO2011075446 | 6/2011 |
| WO | WO2011130325 | 10/2011 |
| WO | 2015103415 A1 | 7/2015 |
| WO | WO2016070080 | 5/2016 |
| WO | WO2016196987 | 12/2016 |
| WO | WO2018187360 | 10/2018 |

OTHER PUBLICATIONS

PCT International Search Report/Written Opinion of International Search Authority for Counterpart application, dated Oct. 17, 2016 of PCT/US2016/035810.

(56) References Cited

OTHER PUBLICATIONS

Kuhn, William. "A Real-Time Pitch Recognition Algorithm for Music Applications." Computer Music Journal, vol. 14, No. 3, Fall 1990, Massachusetts Institute of Technology, Print pp. 60-71.

Johnson. Joel. "Glee on iPhone More than Good—It's Fabulous." Apr. 15, 2010. Web. http://gizmodo.com/5518067/glee-on-iphone-more-than-goodits-fabulous. Accessed Jun. 28, 2011. p. 1-3.

Wortham, Jenna. "Unleash Your Inner Gleek on the iPad." Bits, The New York Times. Apr. 15, 2010. Web. <http://bits.blogs. nytimes.com/2010/04/15/unleash-your-inner-gleek-on-the-ipad/?pagemod.

Gerhard, David. "Pitch Extraction and Fundamental Frequency: History and Current Techniques." Department of Computer Science, University of Regina, Saskatchewan, Cananda. Nov. 2003 Print. p. 1-22.

"Auto-Tune: Intonation Correcting Plug-In." User's Manual. Antares Audio Technologies. 2000. Print. p. 1-52.

Trueman, Daniel. et al. "PLOrk: the Princton Laptop Orchestra, Year 1. "Music Department, Princeton University. 2009 Print. 10 pages.

Conneally, Tim. "The Age of Egregious Auto-tuning: 1998-2009." Tech Gear News-Betanews. Jun. 15, 2009. Web. www.betanews.com/artical/the-age-of-egregious-autotuning-19982009/1245090927 Accessed Dec. 10, 2009.

Baran, Tom. "Autotalent v0.2: Pop Music in a Can!" Department of Electrical Engineering and Computer Science, Massachusetts Institute of Technology. May 22, 2011. Web. http//web.mit.edu/tbaran/www/autotalent.html> Accessed Jul. 5, 2011. p. 1-5.

Atal, Bishnu S. "The History of Linear Prediction." IEEE Signal Processing Magazine. vol. 154, Mar. 2006 Print. p. 154-161.

Shaffer, H. and Ross, M. and Cohen, A. "AMDF Pitch Extractor." 85th Meeting Acoustical Society of America. vol. 54:1, Apr. 13, 1973. Print. p. 340.

Kumparak , Greg. "Gleeks Rejoice! Smule Packs Fox's Glee Into a Fantastic IPhone Application" MobilCrunch. Apr. 15, 2010 Web. Accessed Jun. 28, 2011; <http://www.mobilecrunch.com/2010/04/15gleeks-rejoice-smule-packs-foxs-glee-into-a-fantastic-iphone-app/>.

Rabiner, Lawrence R. "On the Use of Autocorrelation Analysis for Pitch Detection." IEEE Transactions on Acoustics, Speech, and Signal Processing. vol. Assp. -25:Feb. 1, 1977. Print p. 24-33.

Wang, Ge. "Designing Smule's IPhone Ocarina." Center for Computer Research in Music and Acoustics, Standford University. Jun. 2009. Print 5 pages.

Clark, Don; "MuseAmi Hopes to Take Music Automation to New Level." The Wall Street Journal, Digits, Technology News and Insigts, Mar. 19, 2010 Web. Accessed Jul. 6, 2011 <http://blogs.wsj.com/digits/2010/19/museami-hopes-to-take-music-automation-to-new-level/>.

Ananthapadmanabha, Tirupattur V. et al. "Epoch Extraction from Linear Prediction Residual for Identification of Closed Glottis Interval." IEEE Transactions on Acoustics, Speech, and Signal Processing, vol. ASSP-27:4. Aug. 1979. Print. p. 309-319.

Cheng, M.J. "Some Comparisons Among Several Pitch Detection Algorithms." Bell Laboratories. Murray Hill, NJ. 1976. p. 332-335.

International Search Report and Written Opinion mailed in International Application No. PCT/US2010/60135 dated Feb. 8, 2011, 17 pages.

International Search Report mailed in International Application No. PCT/US2011/032185 dated Aug. 17, 2011, 6 pages.

Johnson-Bristow, Robert. "A Detailed Analysis of a Time-Domain Formant Corrected Pitch Shifting Alogorithm" AES: An Audio Engineering Society Preprint. Oct. 1993. Print. 24 pages.

Lent, Keith. "An Efficient Method for Pitch Shifting Digitally Sampled Sounds." Departments of Music and Electrical Engineering, University of Texas at Austin. Computer Music Journal, vol. 13:4, Winter 1989, Massachusetts Institute of Technology. Print. p. 65-71.

McGonegal, Carol A. et al. "A Semiautomatic Pitch Detector (SAPD)." Bell Laboratories. Murray Hill, NJ. May 19, 1975. Print. p. 570-574.

Ying, Goangshiuan S. et al. "A Probabilistic Approach to AMDF Pitch Detection." School of Electrical and Computer Engineering, Purdue University. 1996. Web. <http://purcell.ecn.purdue.edu/~speechg>. Accessed Jul. 5, 2011. 5 pages.

Movie Maker, "Windows Movie Maker: Transitions and Video Effects", [online], published Jan. 2007.

PCT International Search Report/Written Opinion of International Search Authority for Counterpart application, dated Sep. 28, 2018 of PCT/US2018/025937.

PCT International Search Report and Written Opinion for counterpart application dated Jan. 18, 2019 for PCT/US2018/047325 filed Aug. 21, 2018.

* cited by examiner

APPLIED VFX BASED ON MOOD AND VOCAL 1 INTENSITY  APPLIED VFX BASED ON MOOD AND VOCAL 2 INTENSITY

APPLIED VFX BASED ON MOOD AND VOCAL INTENSITY

APPLIED VFX BASED ON MOOD AND JOINT VOCAL INTENSITY

AUDIO-VISUAL EFFECTS SYSTEM FOR AUGMENTATION OF CAPTURED PERFORMANCE BASED ON CONTENT THEREOF

CROSS-REFERENCE TO RELATED APPLICATIONS

The present application claims benefit, under 35 U.S.C. 119(e), of U.S. Provisional Application No. 62/548,122, filed Aug. 21, 2017. The present application is a continuation-in-part of U.S. application Ser. No. 15/910,646, filed Mar. 2, 2018, entitled "AUTOMATED GENERATION OF COORDINATED AUDIOVISUAL WORK BASED ON CONTENT CAPTURED FROM GEOGRAPHICALLY DISTRIBUTED PERFORMERS," and naming Sung, Kim, Moldover, Shimmin, Yang and Cook as inventors, which in turn is a continuation of U.S. application Ser. No. 15/173,041, filed Jun. 3, 2016, now U.S. Pat. No. 9,911,403, which further in turn claims priority of U.S. Provisional Application No. 62/170,255, filed Jun. 3, 2015. The present application is also a continuation-in-part of U.S. application Ser. No. 15/944,537, filed Apr. 3, 2018, entitled "AUDIOVISUAL COLLABORATION METHOD WITH LATENCY MANAGEMENT FOR WIDE-AREA BROADCAST," and naming Holmberg, Hersh, Yang, Cook, and Smith as inventors, which in turn claims priority of U.S. Provisional Application No. 62/480,610, filed Apr. 3, 2017.

The present application is related to U.S. Pat. No. 9,866,731, entitled "COORDINATING AND MIXING AUDIO-VISUAL CONTENT CAPTURED FROM GEOGRAPHICALLY DISTRIBUTED PERFORMERS." Each of the foregoing applications and patents is incorporated by reference herein.

BACKGROUND

Field of the Invention

The invention relates generally to capture and/or processing of vocal audio performances and, in particular, to techniques suitable for use in applying selected visual effects to performance synchronized video in a manner consistent with musical structure of, or underlying, the performance.

Description of the Related Art

The installed base of mobile phones and other portable computing devices grows in sheer number and computational power each day. Hyper-ubiquitous and deeply entrenched in the lifestyles of people around the world, they transcend nearly every cultural and economic barrier. Computationally, the mobile phones of today offer speed and storage capabilities comparable to desktop computers from less than ten years ago, rendering them surprisingly suitable for real-time sound synthesis and other musical applications. Partly as a result, some modern mobile phones, such as iPhone® handheld digital devices, available from Apple Inc., support audio and video playback quite capably.

Like traditional acoustic instruments, mobile phones can be intimate sound producing and capture devices. However, by comparison to most traditional instruments, they are somewhat limited in acoustic bandwidth and power. Nonetheless, despite these disadvantages, mobile phones do have the advantages of ubiquity, strength in numbers, and ultra-mobility, making it feasible to (at least in theory) bring together artists for performance almost anywhere, anytime.

The field of mobile music has been explored in several developing bodies of research. Indeed, recent experience with applications such as the Smule Ocarina™, Smule Magic Piano, and Smule Sing! Karaoke™ (all available from Smule, Inc.) has shown that advanced digital acoustic techniques may be delivered in ways that provide a compelling user experience.

As digital acoustic researchers seek to transition their innovations to commercial applications deployable to modern handheld devices such as the iPhone® handheld and other platforms operable within the real-world constraints imposed by processor, memory and other limited computational resources thereof and/or within communications bandwidth and transmission latency constraints typical of wireless networks, significant practical challenges present. Improved techniques and functional capabilities are desired, particularly relative to video.

SUMMARY AND DESCRIPTION

It has been discovered that, despite many practical limitations imposed by mobile device platforms and application execution environments, audiovisual performances, including vocal music, may be captured or manipulated and (in some cases) coordinated with those of other users in ways that create compelling user experiences. In some cases, the vocal performances of individual users are captured (together with performance synchronized video) on mobile devices or using set-top box type equipment in the context of a karaoke-style presentation of lyrics in correspondence with audible renderings of a backing track. In some cases, pitch cues may be presented to vocalists in connection with the karaoke-style presentation of lyrics and, optionally, continuous automatic pitch correction (or pitch shifting into harmony) may be provided.

Vocal audio of a user together with performance synchronized video is, in some cases or embodiments, captured and coordinated with audiovisual contributions of other users to form composite duet-style or glee club-style or window-paned music video-style audiovisual performances. In some cases, the vocal performances of individual users are captured (together with performance synchronized video) on mobile devices, television-type display and/or set-top box equipment in the context of karaoke-style presentations of lyrics in correspondence with audible renderings of a backing track. Contributions of multiple vocalists can be coordinated and mixed in a manner that selects for presentation, at any given time along a given performance timeline, performance synchronized video of one or more of the contributors. Selections provide a sequence of visual layouts in correspondence with other coded aspects of a performance score such as pitch tracks, backing audio, lyrics, sections and/or vocal parts.

Visual effects schedules are applied to audiovisual performances with differing visual effects applied in correspondence with differing elements of musical structure. In some cases, segmentation techniques applied to one or more audio tracks (e.g., vocal or backing tracks) are used to determine elements of the musical structure. In some cases, applied visual effects schedules are mood-denominated and may be selected by a performer as a component of his or her visual expression or may be determined from an audiovisual performance using machine learning techniques.

In some embodiments of the present invention, a method includes accessing a machine readable encoding of a first audiovisual performance and applying a first visual effect schedule to at least a portion of the first audiovisual performance encoding. The first audiovisual performance is captured as vocal audio with performance synchronized video and has an associated musical structure encoding that includes at least musical section boundaries coded for temporal alignment with the first audiovisual performance encoding. The applied visual effect schedule encodes differing visual effects for differing musical structure elements of the first audiovisual performance encoding and provides visual effect transitions in temporal alignment with at least some of the coded musical section boundaries.

In some embodiments, the method further includes segmenting at least an audio track of the first audiovisual performance encoding to provide the associated musical structure encoding. In some cases or embodiments, the associated musical structure encoding includes group part or musical section metadata. In some cases or embodiments, the differing visual effects differ in either degree or type or both degree and type.

In some embodiments, the method further includes selecting the first visual effect schedule from amongst a plurality of mood-denominated visual effect schedules. In some cases or embodiments, the selecting is based on a computationally-determined mood for at least the captured vocal audio. In some cases or embodiments, the selecting is based on a user interface selection by the vocal audio performer prior to, or coincident with, capture of the vocal audio. In some embodiments, the method further includes (i) selecting (after the audiovisual rendering of the first audiovisual performance) a second visual effect schedule from amongst the plurality of mood-denominated visual effect schedules, the second visual effect schedule differing from the first visual effect schedule, and (ii) applying the second visual effect schedule to at least a portion of the first audiovisual performance encoding. In some embodiments, the method further includes selecting a second visual effect schedule from amongst the plurality of mood-denominated visual effect schedules, the second visual effect schedule differing from the first visual effect schedule; and applying the second visual effect schedule to at least a portion of the first audiovisual performance encoding.

In some embodiments, the method further includes streaming, to an audience at one or more remote client devices, the first audiovisual performance. In some cases or embodiments, the streamed first audiovisual performance is mixed with an encoding of a backing track against which the vocal audio was captured. In some cases or embodiments, the streamed first audiovisual performance is streamed with the first visual effect schedule applied. In some embodiments, the method further includes supplying an identification of the applied visual effect schedule for video effect rendering at one or more of the remote client devices.

In some embodiments, the method further includes transferring (to, from, or via a content server or service platform) the first audiovisual performance together with at least an identifier for the one or more applied visual effect schedules. In some cases or embodiments, the selecting is based on a user interface selection during, or prior to, audiovisual rendering of the first audiovisual performance.

In some cases or embodiments, for a particular mood-denominated visual effect schedule, mood values are parameterized as a two-dimensional quantity, wherein a first dimension of the mood parameterization codes an emotion and wherein second dimension of the mood parameterization codes an intensity. In some embodiments, the method further includes determining an intensity dimension of the mood parameterization based on one or more of: (i) a time-varying audio signal strength or vocal energy density measure computationally determined from the vocal audio and (ii) beats, tempo, signal strength or energy density of a backing audio track.

In some embodiments, the method further includes segmenting the first audiovisual performance encoding to identify the differing musical structure elements. In some cases or embodiments, the segmenting is based at least in part on a computational determination of vocal intensity with at least some segmentation boundaries constrained to temporally align with beats or tempo computationally extracted from a corresponding audio backing track. In some cases or embodiments, the segmenting is based at least in part on a similarity analysis computationally performed on a temporally-aligned lyrics track to classify particular portions of first audiovisual performance encoding as verse or chorus.

In some cases or embodiments, the differing visual effects encoded by the applied visual effect schedule include for a given element thereof, one or more of: (i) a particle-based effect or lens flare, (ii) transitions between distinct source videos, (iii) animations or motion of a frame within a source video, (iv) vector graphics or images of patterns or textures; and (v) color, saturation or contrast. In some cases or embodiments, the associated musical structure encodes musical sections of differing types and the applied visual effect schedule defines differing visual effects for different ones of the encoded musical sections. In some cases or embodiments, the associated musical structure encodes events or transitions and the applied visual effect schedule defines differing visual effects for different ones of the encoded events or transitions.

In some cases or embodiments, the machine readable encoding further encodes at least part of a second audiovisual performance captured as second vocal audio with performance synchronized video, the first and second audiovisual performances constituting a group performance. In some cases or embodiments, the associated musical structure encodes group parts, and the applied visual effect schedule is temporally selective for particular performance synchronized video in correspondence with the encoded musical structure.

In some cases or embodiments, the first and second audiovisual performances present as a duet. In some cases or embodiments, the applied visual effect schedule codes, for at least some musical structure elements, color matching of performance synchronized video for respective performers in the group performance. In some cases or embodiments, the applied visual effect schedule codes, for at least some musical structure elements, a visual blur or blend at an interface between performance synchronized video for respective performers in the group performance. In some cases or embodiments, the first and second audiovisual performances are captured against a common backing track.

In some embodiments, the method further includes capturing the first audiovisual performance at a network-connected vocal capture device communicatively coupled to a content server or service platform from which the musical structure encoding is supplied. In some cases or embodiments, the audiovisual performance capture is performed at the network-connected vocal capture device in accordance with a Karaoke-style operational mechanic in which lyrics are visually presented in correspondence with audible rendering of a backing track.

In some embodiments, the method is performed, at least in part, on a content server or service platform to which geographically-distributed, network-connected, vocal capture devices are communicatively coupled. In some embodiments, the method is performed, at least in part, on a network-connected, vocal capture device communicatively coupled to a content server or service platform. In some embodiments, the method is embodied, at least in part, as a computer program product encoding of instructions executable on a content server or service platform to which a plurality of geographically-distributed, network-connected, vocal capture devices are communicatively coupled.

In some embodiments in accordance with the present invention(s), a system includes a geographically distributed set of network-connected devices configured to capture audiovisual performances including vocal audio with performance synchronized video and a service platform. The service platform is configured to (i) receive encodings of the captured audiovisual performances and, in correspondence with associated musical structure encodings that include at least musical section boundaries coded for temporal alignment with the audiovisual performance encodings, to (ii) apply particular visual effect schedules to at least a portion of the audiovisual performance encodings. The applied visual effect schedules encode differing visual effects for differing musical structure elements of the audiovisual performance encodings and provide visual effect transitions in temporal alignment with at least some of the coded musical section boundaries.

In some cases or embodiments, the service platform is configured to (responsive to user or performer selections) change the applied visual effect schedules and supply resulting captured audiovisual performances to respective ones of the geographically distributed network-connected devices for audiovisual rendering thereon. In some cases or embodiments, the applied visual effect schedules are selected from amongst a plurality of mood-denominated visual effect schedules.

In some embodiments in accordance with the present invention(s), a system includes at least a guest and host pairing of network-connected devices configured to capture at least vocal audio. The host device is configured to (i) receive from the guest device an encoding of a respective encoding of at least vocal audio and, in correspondence with an associated musical structure encoding that includes at least musical section boundaries coded for temporal alignment with an audiovisual performance encoding, to (ii) apply a selected visual effect schedules to the audiovisual performance encoding. The applied visual effect schedules encode differing visual effects for differing musical structure elements of the audiovisual performance encoding and provide visual effect transitions in temporal alignment with at least some of the coded musical section boundaries.

In some cases or embodiments, the host and guest devices are coupled as local and remote peers via communication network with non-negligible peer-to-peer latency for transmissions of audiovisual content, the host device communicatively coupled as the local peer to receive a media encoding of a mixed audio performance constituting vocal audio captured at the guest device, and the guest device is communicatively coupled as the remote peer to supply the media encoding captured from a first one of the performers and mixed with a backing audio track. In some cases or embodiments, the associated musical structure encoding is computationally determined at the host device based on segmenting at least an audio track received from the guest device. In some cases or embodiments, the host device is configured to render the audiovisual performance coding as a mixed audiovisual performance, including vocal audio and performance synchronized video from the first and a second one of the performers, and transmit the audiovisual performance coding as an apparently live broadcast with the selected visual effect schedule applied.

These and other embodiments in accordance with the present invention(s) will be understood with reference to the description and appended claims which follow.

BRIEF DESCRIPTION OF THE DRAWINGS

The present invention is illustrated by way of example and not limitation with reference to the accompanying figures, in which like references generally indicate similar elements or features.

FIG. 3A depicts information flows involving an exemplary coding of musical structure, while FIG. 3B depicts an alternative view that focuses on an exemplary VFX rendering pipeline. Finally, FIG. 3C graphically depicts presents an exemplary mapping of vocal parts and segments to visual layouts, transitions, post-processed video effects and particle-based effects.

Figure 1:
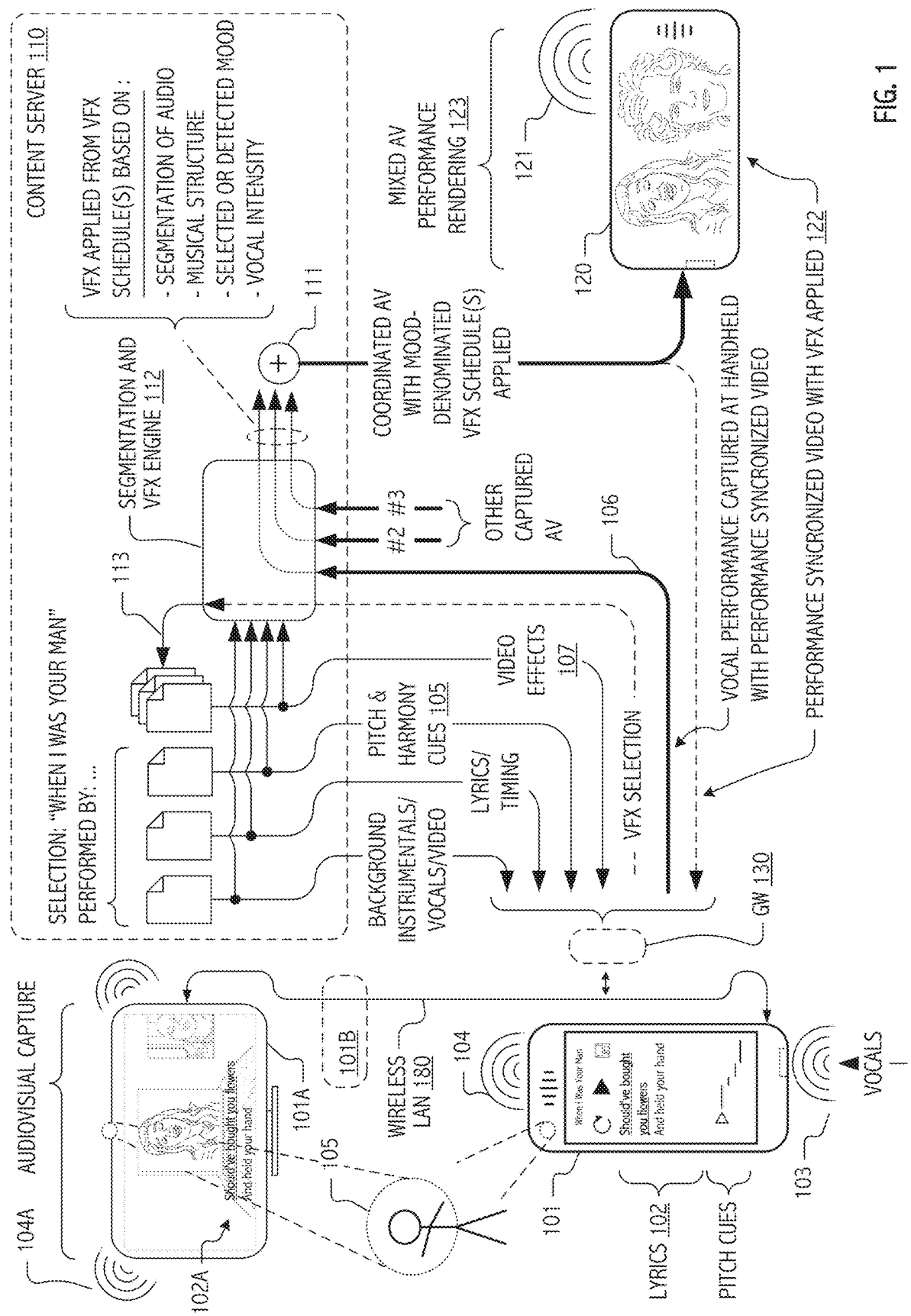
FIG. 1 depicts information flows amongst illustrative mobile phone-type portable computing devices, television-type displays, set-top box-type media application platforms, and an exemplary content server in accordance with some embodiments of the present invention(s) in which a visual effects schedule is applied to an audiovisual performance.

Skilled artisans will appreciate that elements or features in the figures are illustrated for simplicity and clarity and have not necessarily been drawn to scale. For example, the dimensions or prominence of some of the illustrated elements or features may be exaggerated relative to other elements or features in an effort to help to improve understanding of embodiments of the present invention.

DESCRIPTION

Techniques have been developed to facilitate the capture, pitch correction, harmonization, encoding and/or rendering of audiovisual performances on portable computing devices and living room-style entertainment equipment. Vocal audio together with performance synchronized video may be captured and coordinated with audiovisual contributions of other users to form duet-style or glee club-style or window-paned music video-style audiovisual performances. In some cases, the vocal performances of individual users are captured (together with performance synchronized video) on mobile devices, television-type display and/or set-top box equipment in the context of karaoke-style presentations of lyrics in correspondence with audible renderings of a backing track. In some cases, pitch cues may be presented to vocalists in connection with the karaoke-style presentation of lyrics and, optionally, continuous automatic pitch correction (or pitch shifting into harmony) may be provided.

Often, contributions of multiple vocalists are coordinated and mixed in a manner that selects for presentation and, at given times along a given performance timeline applies mood-denominated visual effects to, performance synchronized video of one or more of the contributors. In some cases or embodiments, techniques of the present invention(s) may be applied even to single performer audiovisual content. In general, selections are in accord with a segmentation of certain audio tracks to determine musical structure of the audiovisual performance. Based on the musical structure, particle-based effects, transitions between video sources, animations or motion of frames, vector graphics or images of patterns/textures, color/saturation/contrast and/or other visual effects coded in a video effects schedule are applied to respective portions of the audiovisual performance. In this way, visual effects are applied in correspondence with coded aspects of a performance or features such as vocal tracks, backing audio, lyrics, sections and/or vocal parts. The particular visual effects applied vary throughout the course of a given audiovisual performance based on segmentation performed and/or based on vocal intensity computationally determined for one or more vocal tracks.

In general, for a given song, aspects of the song's musical structure are selective for the particular visual effects applied from a mood-denominated visual effect schedule, and intensity measures (typically vocal intensity, but in some cases, power density of non-vocal audio) are used to modulate or otherwise control the magnitude or prominence of the applied visual effects. For example, in some cases, situations or embodiments, song form, such as {verse, chorus, verse, chorus, bridge . . . }, is used to constrain the mapping. In some cases, such as in a duet, vocal part sequencing (e.g., you sing a line, I sing a line, you sing two words, I sing three, we sing together . . . ) provides structural information that is used to create a sequence of visual layouts. In some cases, situations or embodiments, building intensity of a song (e.g., as measured by acoustic power, tempo or some other measure) can be selective for the particular visual effects applied from a particular vocal effects schedule.

Optionally, and in some cases or embodiments, vocal audio can be pitch-corrected in real-time at the vocal capture device (e.g., at a portable computing device such as a mobile phone, personal digital assistant, laptop computer, notebook computer, pad-type computer or netbook) in accord with pitch correction settings. In some cases, pitch correction settings code a particular key or scale for the vocal performance or for portions thereof. In some cases, pitch correction settings include a score-coded melody and/or harmony sequence supplied with, or for association with, the lyrics and backing tracks. Harmony notes or chords may be coded as explicit targets or relative to the score-coded melody or even actual pitches sounded by a vocalist, if desired. Machine usable musical instrument digital interface-style (MIDI-style) codings may be employed for lyrics, backing tracks, note targets, vocal parts (e.g., vocal part 1, vocal part 2, . . . together), musical section information (e.g., intro/outro, verse, pre-chorus, chorus, bridge, transition and/or other section codings), etc. In some cases or embodiments, conventional MIDI-style codings may be extended to also encode a score-aligned, progression of visual effects to be applied.

Based on the compelling and transformative nature of pitch-corrected vocals, performance synchronized video and score-coded harmony mixes, user/vocalists may overcome an otherwise natural shyness or angst associated with sharing their vocal performances. Instead, even geographically distributed vocalists are encouraged to share with friends and family or to collaborate and contribute vocal performances as part of social music networks. In some implementations, these interactions are facilitated through social network- and/or eMail-mediated sharing of performances and invitations to join in a group performance. Using uploaded vocals captured at clients such as the aforementioned portable computing devices, a content server (or service) can mediate such coordinated performances by manipulating and mixing the uploaded audiovisual content of multiple contributing vocalists. Depending on the goals and implementation of a particular system, in additional to video content, uploads may include pitch-corrected vocal performances (with or without harmonies), dry (i.e., uncorrected) vocals, and/or control tracks of user key and/or pitch correction selections, etc.

Social music can be mediated in any of a variety of ways. For example, in some implementations, a first user's vocal performance, captured against a backing track at a portable computing device and typically pitch-corrected in accord with score-coded melody and/or harmony cues, is supplied, as a seed performance, to other potential vocal performers. Performance synchronized video is also captured and may be supplied with the pitch-corrected, captured vocals. The supplied vocals are typically mixed with backing instrumentals/vocals and form the backing track for capture of a second (and potentially successive) user's vocals. Often, the successive vocal contributors are geographically separated and may be unknown (at least a priori) to each other, yet the intimacy of the vocals together with the collaborative experience itself tends to minimize this separation. As successive vocal performances and video are captured (e.g., at respective portable computing devices) and accreted as part of the social music experience, the backing track against which respective vocals are captured may evolve to include previously captured vocals of other contributors.

In some cases, vocals (and typically synchronized video) are captured as part of a live or unscripted performance with vocal interactions (e.g., a duet or dialog) between collaborating contributors. It is envisioned that non-negligible network communication latencies will exist between at least some of the collaborating contributors, particularly where those contributors are geographically separated. As a result, a technical challenge exists to manage latencies and the captured audiovisual content in such a way that a combined audio visual performance nonetheless can be disseminated (e.g., broadcast) in a manner that presents to recipients, listeners and/or viewers as a live interactive collaboration.

The above-incorporated U.S. application Ser. No. 15/944, 537 details a variety of suitable technical solutions to such challenges. For example, in one technique for accomplishing a facsimile of live interactive performance collaboration, actual and non-negligible network communication latency is (in effect) masked in one direction between a guest and host performer and tolerated in the other direction. For example, a captured audiovisual performance of a guest performer on a "live show" internet broadcast of a host performer could include a guest+host duet sung in apparent real-time synchrony. In some cases, the guest could be a performer who has popularized a particular musical performance. In some cases, the guest could be an amateur vocalist given the opportunity to sing "live" (though remote) with the popular artist or group "in studio" as (or with) the show's host. Notwithstanding a non-negligible network communication latency from guest-to-host involved in the conveyance of the guest's audiovisual contribution stream (perhaps 200-500 ms or more), the host performs in apparent synchrony with (though temporally lagged from, in an absolute sense) the guest and the apparently synchronously performed vocals are captured and mixed with the guest's contribution for broadcast or dissemination.

The result is an apparently live interactive performance (at least from the perspective of the host and the recipients, listeners and/or viewers of the disseminated or broadcast performance). Although the non-negligible network communication latency from guest-to-host is masked, it will be understood that latency exists and is tolerated in the host-to-guest direction. However, host-to-guest latency, while discernible (and perhaps quite noticeable) to the guest, need not be apparent in the apparently live broadcast or other dissemination. It has been discovered that lagged audible rendering of host vocals (or more generally, of the host's captured audiovisual performance) need not psychoacoustically interfere with the guest's performance.

Performance synchronized video may be captured and included in a combined audiovisual performance that constitutes the apparently live broadcast, wherein visuals may be based, at least in part, on time-varying, computationally-defined audio features extracted from (or computed over) captured vocal audio. In some cases or embodiments, these computationally-defined audio features are selective, over the course of a coordinated audiovisual mix, for particular synchronized video of one or more of the contributing vocalists (or prominence thereof).

In some cases, captivating visual animations and/or facilities for listener comment and ranking, as well as duet, glee club or choral group formation or accretion logic are provided in association with an audible rendering of a vocal performance (e.g., that captured and pitch-corrected at another similarly configured mobile device) mixed with backing instrumentals and/or vocals. Synthesized harmonies and/or additional vocals (e.g., vocals captured from another vocalist at still other locations and optionally pitch-shifted to harmonize with other vocals) may also be included in the mix. Geocoding of captured vocal performances (or individual contributions to a combined performance) and/or listener feedback may facilitate animations or display artifacts in ways that are suggestive of a performance or endorsement emanating from a particular geographic locale on a user manipulable globe. In this way, implementations of the described functionality can transform otherwise mundane mobile devices into social instruments that foster a sense of global connectivity, collaboration and community.

Karaoke-Style Vocal Performance Capture

Although embodiments of the present invention(s) are not limited thereto, pitch-corrected, karaoke-style, vocal capture using mobile phone-type and/or television-type audiovisual equipment provides a useful descriptive context. Likewise, although embodiments of the present invention(s) are not limited to multi-performer content, coordinated multi-performer audiovisual content, including multi-vocal content captured or prepared asynchronously or that captured and live-streamed with latency management techniques described herein, provides a useful descriptive context.

In some embodiments such as illustrated in FIG. 1, an iPhone® handheld available from Apple Inc. (or more generally, handheld 101) hosts software that executes in coordination with a content server 110 to provide vocal capture and continuous real-time, score-coded pitch correction and harmonization of the captured vocals. Performance synchronized video may be captured using a camera provided by, or in connection with, a television or other audiovisual media device 101A or connected set-top box equipment (101B) such as an Apple TV™ device. Performance synchronized video may also be captured using an on-board camera provided by handheld 101.

As is typical of karaoke-style applications (such as the Sing! Karaoke™ app available from Smule, Inc.), a backing track of instrumentals and/or vocals can be audibly rendered for a user/vocalist to sing against. In such cases, lyrics may be displayed (102, 102A) in correspondence with the audible rendering (104, 104A) so as to facilitate a karaoke-style vocal performance by a user. In the illustrated configuration of FIG. 1, lyrics, timing information, pitch and harmony cues (105), backing tracks (e.g., instrumentals/vocals), performance coordinated video, schedules of video effects (107), etc. may all be sourced from a network-connected content server 110. In some cases or situations, backing audio and/or video may be rendered from a media store such as an iTunes™ library or other audiovisual content store resident or accessible from the handheld, a set-top box, media streaming device, etc.

Figure 10:
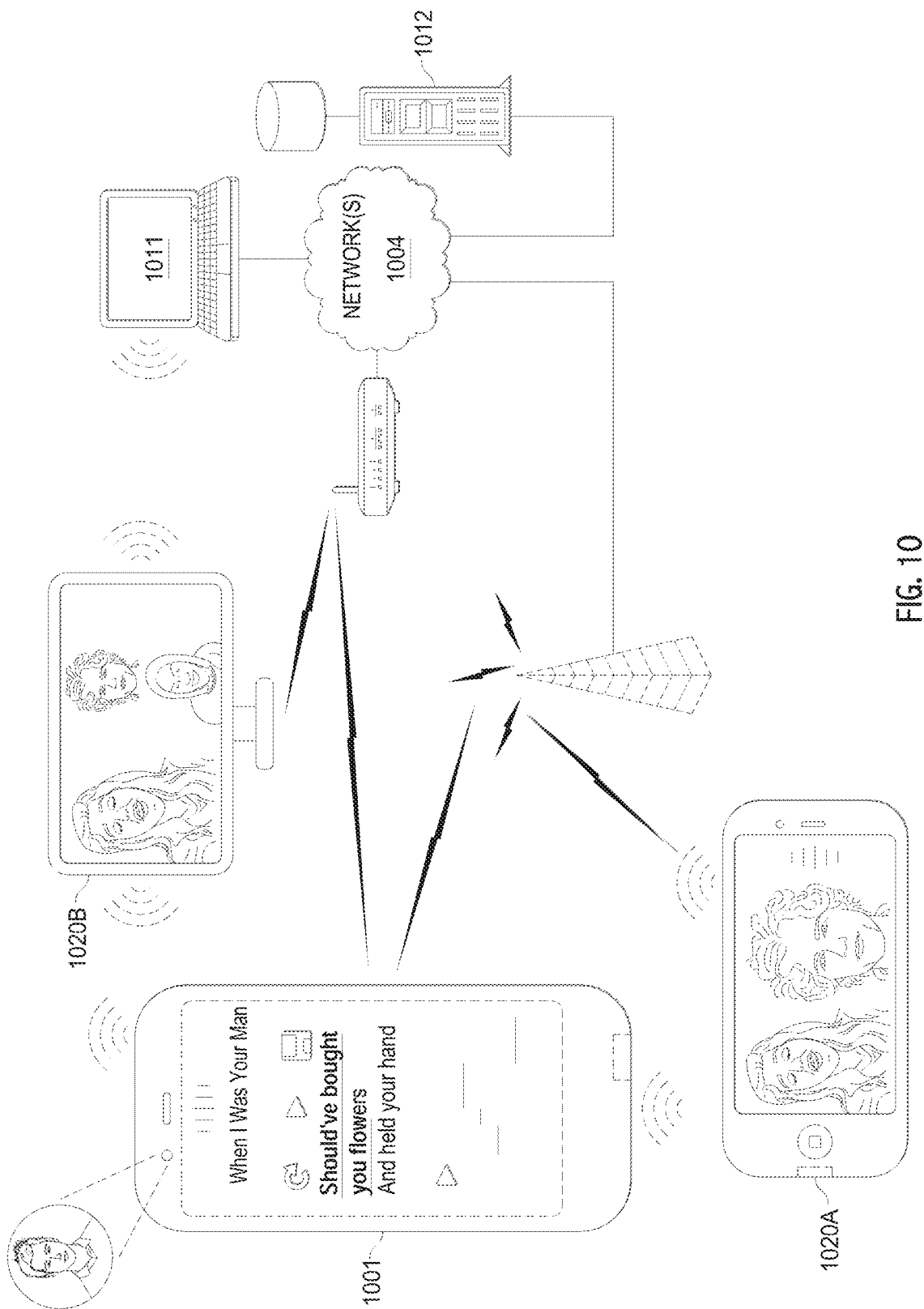
FIG. 10 is a network diagram that illustrates cooperation of exemplary devices in accordance with some embodiments of the present invention(s).

For simplicity, a wireless local area network 180 may be assumed to provide communications between handheld 101, any audiovisual and/or set-top box equipment and a wide-area network gateway to hosted service platforms such as content server 110. FIG. 10 depicts an exemplary network configuration. However, based on the description herein, persons of skill in the art will recognize that any of a variety of data communications facilities, including 802.11 Wi-Fi, Bluetooth™, 4G-LTE wireless, wired data networks, wired or wireless audiovisual interconnects such as in accord with HDMI, AVI, Wi-Di standards or facilities may employed, individually or in combination to facilitate communications and/or audiovisual rendering described herein.

Referring again to the example of FIG. 1, user vocals 103 are captured at handheld 101, and optionally pitch-corrected continuously and in real-time either at the handheld or using computational facilities of audiovisual display and/or set-top box equipment (101B) and audibly rendered (see 104, 104A) mixed with the backing track to provide the user with an improved tonal quality rendition of his/her own vocal performance. Note that while captured vocals 103 and audible rendering 104, 104A are illustrated using a convenient visual symbology that is centric on microphone and speaker facilities of handheld 101 or television/audiovisual media device 101A, persons of skill in the art having benefit of the present disclosure will appreciate that, in many cases, microphone and speaker functionality may be provided using attached or wirelessly-connected ear buds, headphones, speakers, feedback isolated microphones, etc. Accordingly, unless specifically limited, vocal capture and audible rendering should be understood broadly and without limitation to a particular audio transducer configuration.

Pitch correction, when provided, is typically based on score-coded note sets or cues (e.g., pitch and harmony cues 105), which provide continuous pitch-correction algorithms with performance synchronized sequences of target notes in a current key or scale. In addition to performance synchronized melody targets, score-coded harmony note sequences (or sets) can provide pitch-shifting algorithms with additional targets (typically coded as offsets relative to a lead melody note track and typically scored only for selected portions thereof) for pitch-shifting to harmony versions of the user's own captured vocals. In some cases, pitch correction settings may be characteristic of a particular artist such as the artist that originally performed (or popularized) vocals associated with the particular backing track.

In addition, lyrics, melody and harmony track note sets and related timing and control information may be encapsulated as a score coded in an appropriate container or object (e.g., in a Musical Instrument Digital Interface, MIDI, or Java Script Object Notation, json, type format) for supply together with the backing track(s). Using such information, handheld 101, audiovisual display 101A and/or set-top box equipment, or both, may display lyrics and even visual cues related to target notes, harmonies and currently detected vocal pitch in correspondence with an audible performance of the backing track(s) so as to facilitate a karaoke-style vocal performance by a user. Thus, if an aspiring vocalist selects "When I was your Man" as popularized by Bruno Mars, your_man.json and your_man.m4a may be downloaded from content server 110 (if not already available or cached based on prior download) and, in turn, used to provide background music, synchronized lyrics and, in some situations or embodiments, score-coded note tracks for continuous, real-time pitch-correction while the user sings.

Optionally, at least for certain embodiments or genres, harmony note tracks may be score coded for harmony shifts to captured vocals. Typically, a captured pitch-corrected (possibly harmonized) vocal performance together with performance synchronized video is saved locally, on the handheld device or set-top box, as one or more audiovisual files and is subsequently compressed and encoded for upload (106) to content server 110 as an MPEG-4 container file. MPEG-4 is an international standard for the coded representation and transmission of digital multimedia content for the Internet, mobile networks and advanced broadcast applications. Other suitable codecs, compression techniques, coding formats and/or containers may be employed if desired.

Depending on the implementation, encodings of dry vocals and/or pitch-corrected vocals may be uploaded (106) to content server 110. In general, such vocals (encoded, e.g., in an MPEG-4 container or otherwise) whether already pitch-corrected or pitch-corrected at content server 110 can then be mixed (111), e.g., with backing audio and other captured (and possibly pitch-shifted) vocal performances, to produce files or streams of quality or coding characteristics selected accord with capabilities or limitations a particular target or network (e.g., handheld 120, audiovisual display and/or set-top box equipment, a social media platform, etc.).

As further detailed herein, performances of multiple vocalists (including performance synchronized video) may be accreted and combined, such as to present as a duet-style performance, glee club, window-paned music video-style composition or vocal jam session. In some embodiments, a performance synchronized video contribution (for example, in the illustration of FIG. 1, performance synchronized video 122 including a performance captured at handheld 101 or using audiovisual and/or set-top box equipment 101A, 101B) may be presented in the resulting mixed audiovisual performance rendering 123 with video effects applied and dynamically varied throughout the mixed audiovisual performance rendering 123. Video effects applied thereto are based at least in part on application of a video effects (VFX) schedule selected (113) based either on user selection or a computationally determined mood. In some cases or embodiments, one or more VFX schedules may be mood-denominated set of recipes and/or filters that may be applied to present a particular mood. Segmentation and VFX Engine 112 determines musical structure and applies particular visual effects in accordance with the selected video effects. In general, the particular visual effects applied are based on segmentation of vocal and/or backing track audio, determined or coded musical structure, a selected or detected mood or style and computationally-determined vocal or audio intensity.

VFX schedule selection may be by a user at handheld 101 or using audiovisual and/or set-top box equipment 101A, 101B. For example, a user may select a mood-denominated VFX schedule that includes video effects selected to provide a palette of "sad" or "somber" video processing effects. One such palette may provide and apply, in connection with determined or coded musical structure, filters providing colors, saturations and contrast that tend to evoke a "sad" or "somber" mood, provide transitions between source videos with little visual energy and/or include particle based effects that present rain, fog, or other effects consistent with the selected mood. Other palettes may provide and apply, again in connection with determined or coded musical structure, filters providing colors, saturations and contrast that tend to evoke an "peppy" or "energetic" mood, provide transitions between source videos with significant visual energy or movement, include lens flares or particle based effects augment a visual scene with bubbles, balloons, fireworks or other visual features consistent with the selected mood.

In some embodiments, recipes and/or filters of a given VFX schedule may be parameterized, e.g., based on computational features, such as average vocal energy, extracted from audio performances or based on tempo, beat, or audio energy of backing tracks. In some cases, or embodiments, lyrics or musical selection metadata may be employed for VFX schedule selection. In general, it will be understood in the context of the description and claims that follow, that visual effects schedules may, in some cases or embodiments, be iteratively selected and applied to a given performance or partial performance, e.g., as a user or a contributing vocalist or a post-process video editor seeks to create a particular mood, be it "sad," "pensive," "peppy" or "romantic."

For simplicity of the initial illustration, FIG. 1 depicts performance synchronized audio (103) and video (105) capture of a performance 106 that is uploaded to content server 110 (or service platform) and distributed to one or more potential contributing vocalists or performers, e.g., as a seed performance against which the other contributing vocalists or performers (#2, #3 . . . #N) capture additional audiovisual (AV) performances. FIG. 1 depicts the supply of other captured AV performances #2, #3 . . . #N for audio mix and visual arrangement 111 at content server 110 to produce performance synchronized video 122. In general, applied visual effects may be varied throughout the mixed audiovisual performance rendering 123 in accord with a particular visual effects schedule and segmentation of one or more of the constituent AV performances. In some cases, segmentation may be based on signal processing of vocal audio and/or based on precoded musical structure, including vocal part or section notations, phrase or repetitive structure of lyrics, etc.

Figure 2A:
FIGS. 2A, 2B and 2C are successive snapshots of vocal performance synchronized video along a coordinated audiovisual performance timeline wherein, in accordance with some embodiments of the present invention, video for one, the other or both of two contributing vocalist has vocal effects applied based on a mood and based on a computationally-defined audio feature such as vocal intensity computed over the captured vocals.
Figure 2B:
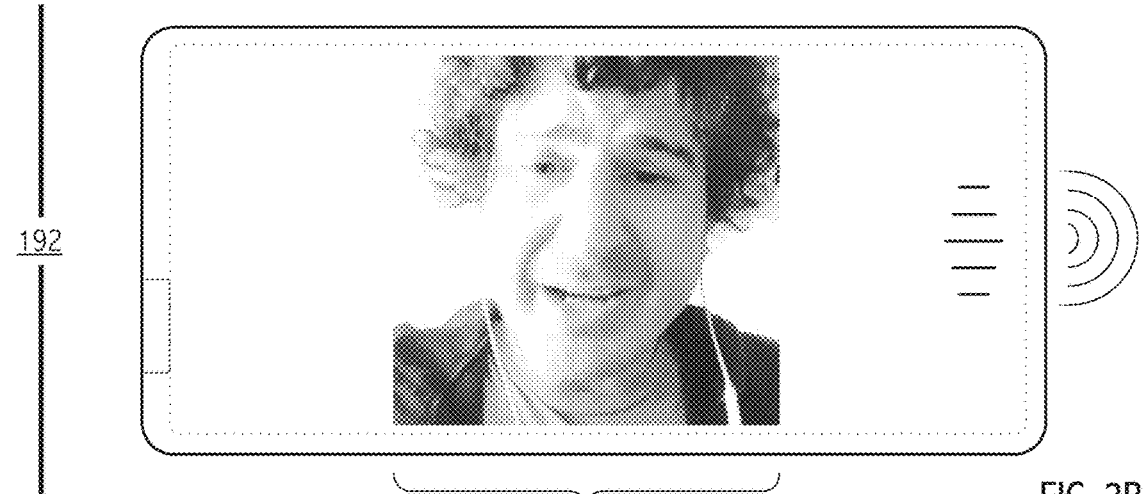
Figure 2C:

FIGS. 2A, 2B and 2C are successive snapshots 191, 192 and 193 of vocal performance synchronized video along a coordinated audiovisual performance timeline 151 wherein, in accordance with some embodiments of the present invention, video 123 for one, the other or both of two contributing vocalist has vocal effects applied based on a mood and based on a computationally-defined audio feature such as vocal intensity computed over the captured vocals. Although the images of FIGS. 2A, 2B and 2C do not attempt to faithfully depict particular video effects (which tend to be dynamic and can be visually subtle), persons of ordinary skill having benefit of the present disclosure will understand that, for a first portion (represented by snapshot 191) of a coordinated audiovisual performance, VFX are applied to performance synchronized video for individual performers based on the respective selected or detected mood for that performer and based vocal intensity of the particular performance. For a second portion (represented by snapshot 192) of the coordinated audiovisual performance, VFX are applied to performance synchronized video for a single performer based on a selected or detected mood for that performer and a current vocal intensity. Finally, for a third portion (such as a chorus, represented by snapshot 193) of the coordinated audiovisual performance, VFX are applied to performance synchronized video of both performers based on a joint or composited mood (whether detected or selected) for the performers and a current measure of joint vocal intensity.

As will be understood by persons of skill in the art having benefit of the present disclosure, performance timeline 151 carries performance synchronized video across various audio segmentation boundaries, across section and/or group part transitions, and through discrete moments, such that snapshots 191, 192 and 193 will be expected to apply, at different portions of the performance timeline and based on musical structure of the audio, different aspects of a particular VFX schedule, e.g., different VFX recipes and VFX filters thereof.

Figure 3A:
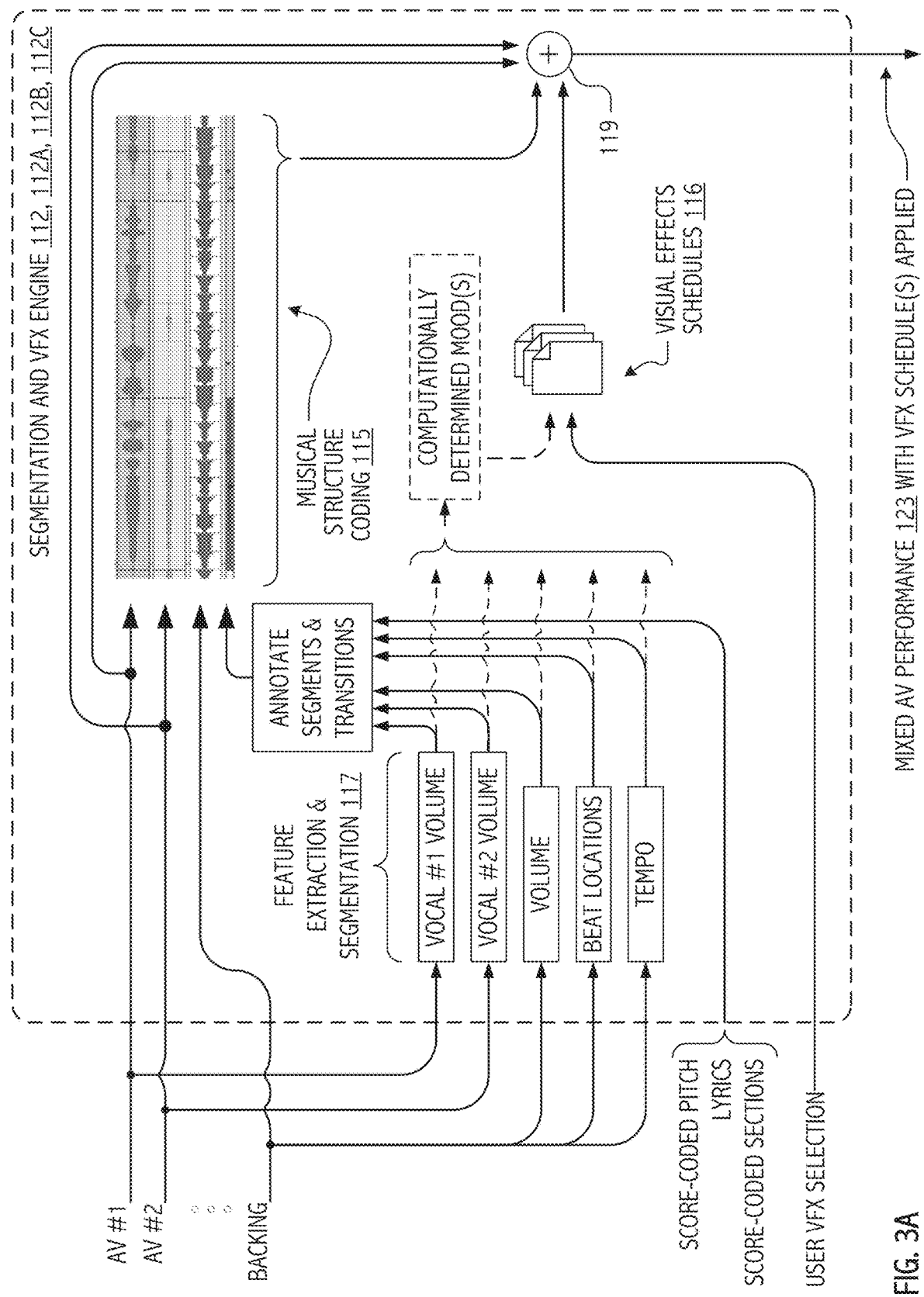
FIGS. 3A, 3B and 3C illustrates an exemplary implementation of a segmentation and video effects (VFX) engine in accordance with some embodiments of the present invention(s).
Figure 3B:
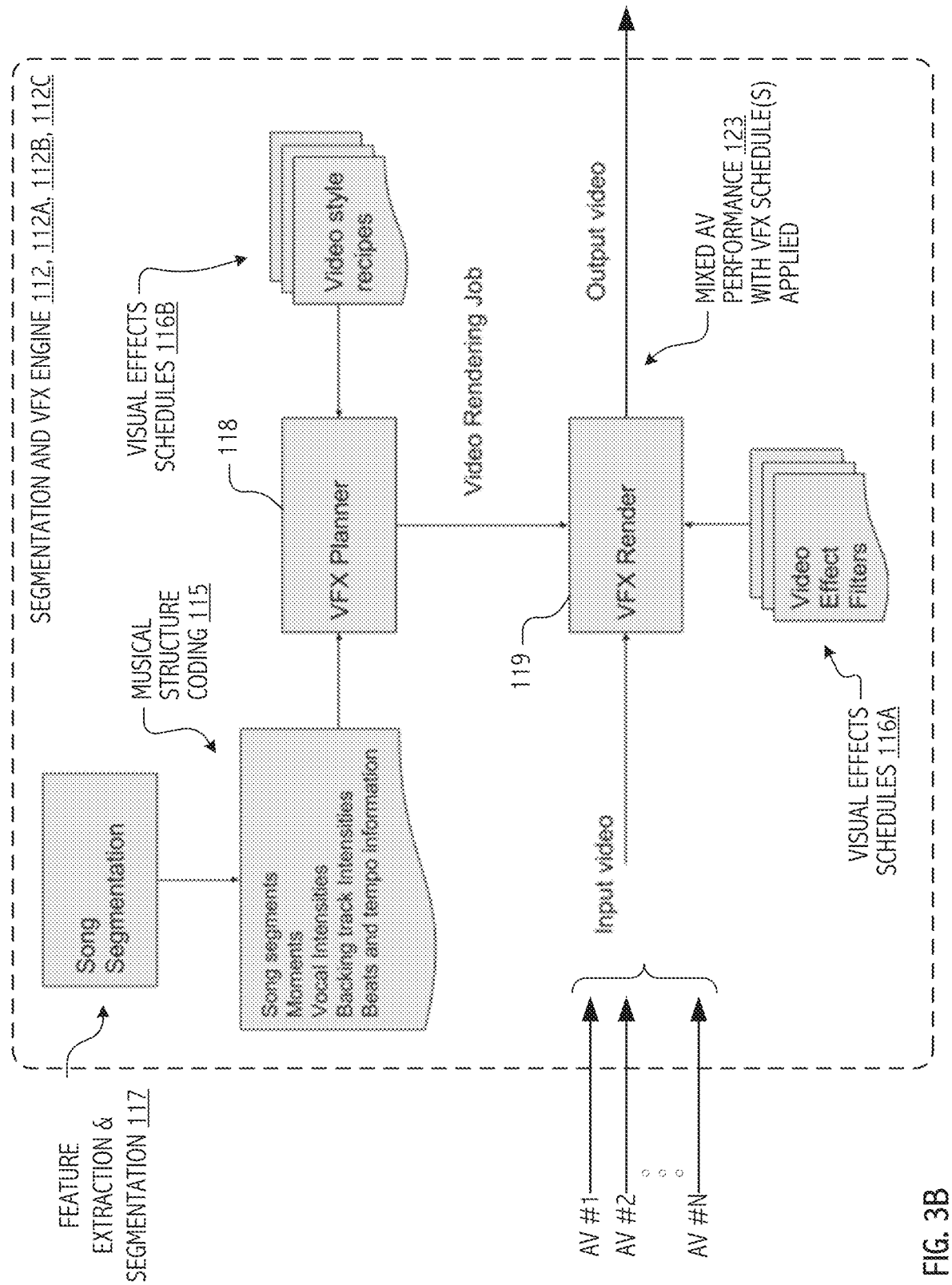
Figure 3C:
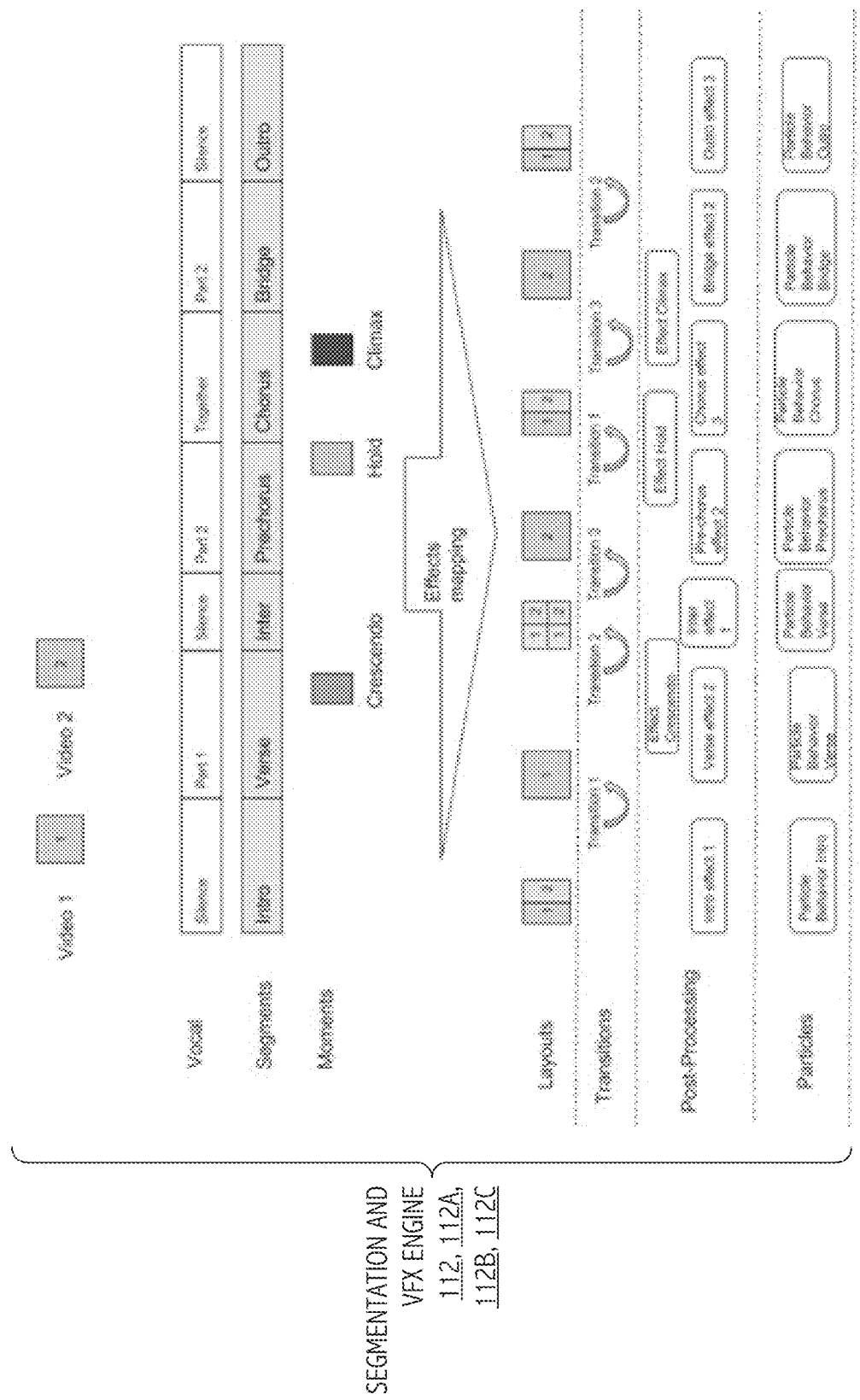

FIGS. 3A, 3B and 3C illustrate an exemplary implementation of a segmentation and video effects (VFX) engine 112 (recall FIG. 1) in accordance with some embodiments of the present invention(s). In particular, FIG. 3A depicts information flows involving an exemplary coding of musical structure 115 in which audio features of performance synchronized vocal tracks (e.g., vocal #1 and vocal #2) and a backing track are extracted to provide segmentation and annotation for musical structure coding 115.

Feature extraction and segmentation 117 provides the annotations and transition markings of musical structure coding 115 to apply recipes and filters from a selected visual effects schedule prior to video rendering 119. For example, in the exemplary implementation illustrated, feature extraction and segmentation operates on:
  vocals: segmentation "singing" vs. "not singing", instantaneous loudness, relative loudness of each segment.
  backing tracks: tempo, instantaneous loudness, beat detection.
  midi files: pitch, harmony, lyrics, "part" arrangement markers (when each vocalist should sing).

In an exemplary implementation, a vocal track is treated as consisting of singing and silence segments. Feature extraction seeks to classify portions of a solo vocal track into silence and singing segments. For duet vocal tracks of part 1 and 2, Feature extraction seeks to classify them into silence, part 1 singing, part 2 singing, and singing together segments. Next, segment typing is performed. For example, in some implementations, a global average vocal intensity and average vocal intensities per segment are computed to determine the "musical intensity" of each segment with respect to a particular singer's performance of a song. Stated differently, segmentation algorithms see, to determine whether a give section is a "louder" section, or a "quieter" section. The start time and end time of every lyric line are also retrieved from the lyric metadata in some implementations to facilitate segment typing. Valid segment types and classification criteria include:
  Intro: Segment(s) before the start of the first lyric line.
  Verse: Intensity of the segment is lower than the singer's average vocal intensity.
  Bridge: Like verse, but locating in the second half of a song.
  Pre-chorus: A segment before the chorus segment.
  Inter: Silent segments but not intro or outro segments
  Outro: Segment(s) after the end of the last lyric line Feature extraction and segmentation 117 may also include further audio signal processing to extract the timing of beats and down beats in the backing track, and to align the determined segments to down beats. In some implementations, a Beat Per Minute (BPM) measure is calculated for determining the tempo of the song, and moments such as climax, hold and crescendo identified by using vocal intensities and pitch information. For example, moment types and classification criteria may include:
  Climax: A segment is also marked as a climax segment if it has the highest vocal intensity.
  Hold: if a note has a pitch length longer than a predetermined threshold.
  Crescendo: a sequence of notes with increasing pitch.

In general, these and other annotations and segmentations may be used with styles, recipes and filters to provide performance-driven visual effects.

FIG. 3B depicts additional detail for an embodiment that decomposes its visual effect schedules into a video style-denominated recipes (116B) used for VFX planning and a particular video filters (116A) used in an exemplary VFX rendering pipeline. Video style may be user selected or, in some embodiments, may be selected based on a computationally-determined mood. In general, for a given video style, multiple recipes are defined and specialized for particular song tempos, recording type (SOLO, duet, or partner artist), etc. A recipe typically defines the visual effects such as layouts, transitions, post-processing, color filter, watermarks, and logos for each segment type or moment. Based the determined tempo and recording type of a song, an appropriate recipe is selected from the set (116B) thereof.

VFX planner 118 maps the extracted features (segments and moments that were annotated or marked in musical structure coding 115, as described above) to particular visual effects based on the selected video style recipe (116B). VFX planner 118 generates a video rendering job containing a series of visual effect configurations. For each visual effect configuration, one set of configuration parameters is generated. Parameters such the name of a prebuilt video effect, input video, start and end time, backing track intensities and vocal intensities during the effect, beats timing information during the effect, specific control parameters of the video effect and etc. Video effects specified in the configuration can be pre-built and coded for directly use by the VFX renderer 119 to render the coded video effect. Vocal intensities and backing track intensities are used to drive the visual effects. Beats timing information is used to align applied video effects with audio.

Finally, FIG. 3C graphically depicts presents an exemplary mapping of vocal parts and segments to visual layouts, transitions, post-processed video effects and particle-based effects, such as may be represented as musical structure coding 115 (recall FIG. 3A) or, in some embodiments, by video style-denominated recipes (116B) used for VFX planning and a particular video filters (116A) for VFX rendering. For example, computationally determined segments (intro, verse, inter, pre-chorus, bridge and outro) are mapped to particular visual layouts, post-processed effects and particle-based effects, with coded visual transitions between segments.

Figure 4:
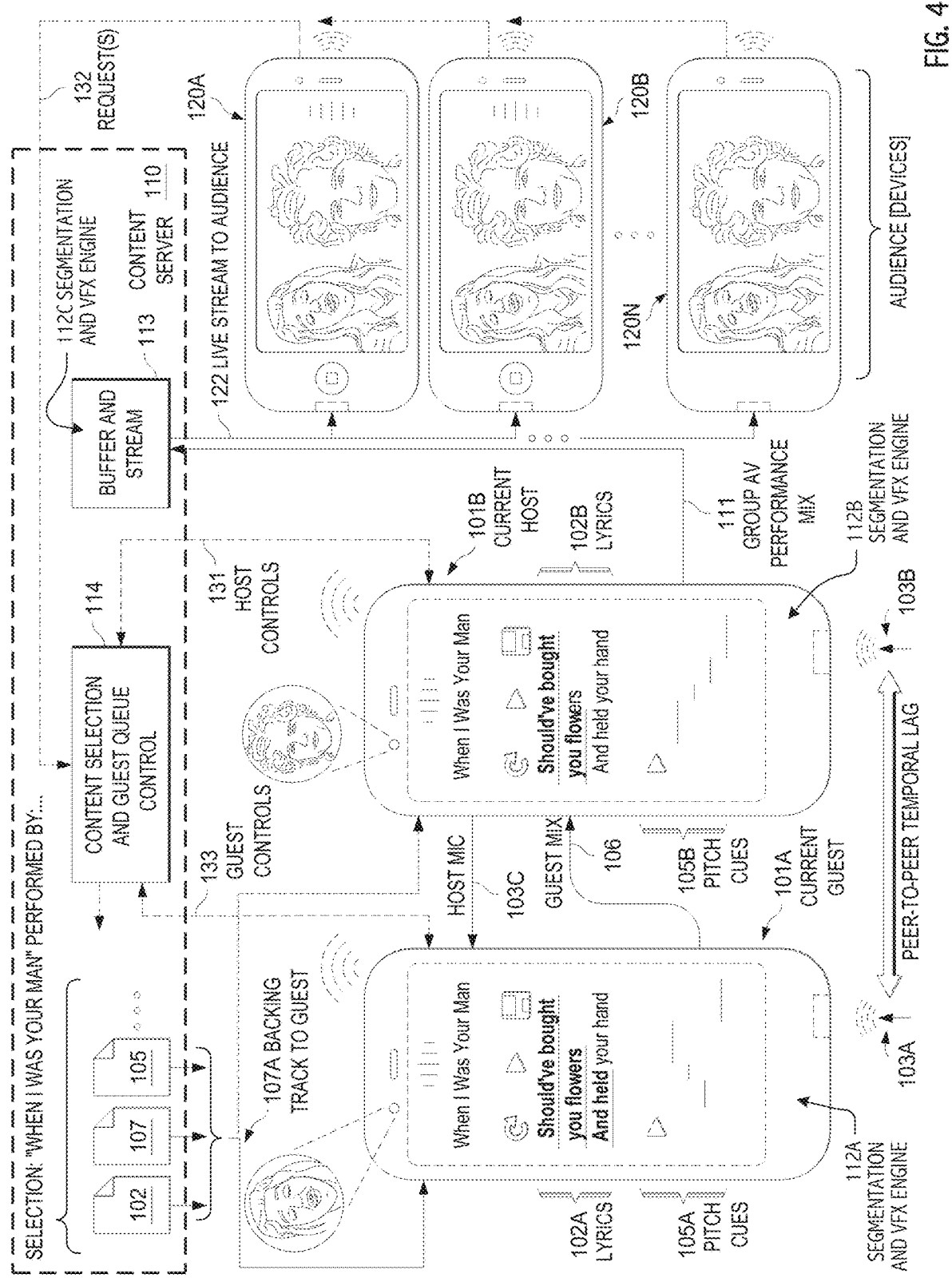
FIG. 4 depicts information flows amongst illustrative mobile phone-type portable computing devices in a host and guest configuration in accordance with some embodiments of the present invention(s) in which a visual effects schedule is applied to a live-stream, duet-type group audiovisual performance.

FIG. 4 depicts a variation on previously-described information flows. Specifically, FIG. 4 depicts flows amongst illustrative mobile phone-type portable computing devices in a host and guest configuration in accordance with some embodiments of the present invention(s) in which a visual effects schedule is applied to a live-stream, duet-type group audiovisual performance.

In the illustration of FIG. 4, a current host user of current host device 101B at least partially controls the content of a live stream 122 that is buffered for, and streamed to, an audience on devices 120A, 120B . . . 120N. In the illustrated configuration, a current guest user of current guest device 101A contributes to the group audiovisual performance mix 111 that is supplied (eventually via content server 110) by current host device 101B as live stream 122. Although devices 120A, 120B . . . 120N and, indeed, current guest and host devices 101A, 101B are, for simplicity, illustrated as handheld devices such as mobile phones, persons of skill in the art having benefit of the present disclosure will appreciate that any given member of the audience may receive live-stream 122 on any suitable computer, smart television, tablet, via a set-top box or other streaming media capable client.

Content that is mixed to form group audiovisual performance mix 111 is captured, in the illustrated configuration, in the context of karaoke-style performance capture wherein lyrics 102, optional pitch cues 105 and, typically, a backing track 107 are supplied from content server 110 to either or both of current guest device 101A and current host device 101B. A current host (on current host device 101B) typically exercises ultimate control over the live stream, e.g., by selecting a particular user (or users) from the audience to act as the current guest(s), by selecting a particular song from a request queue (and/or vocal parts thereof for particular users), and/or by starting, stopping or pausing the group AV performance. Once the current host selects or approves a guest and/or song, the guest user may (in some embodiments) start/stop/pause the roll of backing track 107A for local audible rendering and otherwise control the content of guest mix 106 (backing track roll mixed with captured guest audiovisual content) supplied to current host device 101B. Roll of lyrics 102A and optional pitch cues 105A at current guest device 101A is in temporal correspondence with the backing track 107A, and is likewise subject start/stop/pause control by the current guest. In some cases or situations, backing audio and/or video may be rendered from a media store such as an iTunes™ library resident or accessible from a handheld, set-top box, etc.

As will be appreciated by persons of skill in the art having benefit of the present disclosure, instances of segmentation and VFX engine functionality such as previously described (recall FIG. 1, segmentation and VFX engine 112) may, in the guest-host, live-stream configuration of FIG. 4, be distributed to host 101B, guest 101A and/or content server 110. Descriptions of segmentation and VFX engine 112 relative to FIGS. 3A, 3B and 3C will thus be understood to analogously describe implementations of similar functionality 112A, 112B and/or 112C relative to devices or components of FIG. 4.

Typically, in embodiments in accordance with the guest-host, live-stream configuration of FIG. 4, song requests 132 are audience-sourced and conveyed by signaling paths to content selection and guest queue control logic 112 of content server 110. Host controls 131 and guest controls 133 are illustrated as bi-directional signaling paths. Other queuing and control logic configurations consistent with the operations described, including host or guest controlled queuing and/or song selection, will be appreciated based on the present disclosure.

Notwithstanding a non-negligible temporal lag (typically 100-250 ms, but possibly more), current host device 101B receives and audibly renders guest mix 106 as a backing track against which the current host's audiovisual performance are captured at current host device 101B. Roll of lyrics 102B and optional pitch cues 105B at current host device 101B is in temporal correspondence with the backing track, here guest mix 106. To facilitate synchronization to the guest mix 106 in view of temporal lag in the peer-to-peer communications channel between current guest device 101A and current host device 101B as well as for guest-side start/stop/pause control, marker beacons may be encoded in the guest mix to provide the appropriate phase control of lyrics 102B and optional pitch cues 105B on screen. Alternatively, phase analysis of any backing track 107A included in guest mix 106 (or any bleed through, if the backing track is separately encoded or conveyed) may be used to provide the appropriate phase control of lyrics 102B and optional pitch cues 105B on screen at current host device 101B.

It will be understood that temporal lag in the peer-to-peer communications channel between current guest device 101A and current host device 101B affects both guest mix 106 and communications in the opposing direction (e.g., host mic 103C signal encodings). Any of a variety of communications channels may be used to convey audiovisual signals and controls between current guest device 101A and current host device 101B, as well as between the guest and host devices 101A, 101B and content server 110 and between audience devices 120A, 120B . . . 120N and content server 110. For example, respective telecommunications carrier wireless facilities and/or wireless local area networks and respective wide-area network gateways (not specifically shown) may provide communications to and from devices 101A, 101B, 120A, 120B . . . 120N. Based on the description herein, persons of skill in the art will recognize that any of a variety of data communications facilities, including 802.11 Wi-Fi, Bluetooth™, 4G-LTE wireless, wired data networks, wired or wireless audiovisual interconnects such as in accord with HDMI, AVI, Wi-Di standards or facilities may employed, individually or in combination to facilitate communications and/or audiovisual rendering described herein.

User vocals 103A and 103B are captured at respective handhelds 101A, 101B, and may be optionally pitch-corrected continuously and in real-time and audibly rendered mixed with the locally-appropriate backing track (e.g., backing track 107A at current guest device 101A and guest mix 106 at current host device 101B) to provide the user with an improved tonal quality rendition of his/her own vocal performance. Pitch correction is typically based on score-coded note sets or cues (e.g., the pitch and harmony cues 105A, 105B visually displayed at current guest device 101A and at current host device 101B, respectively), which provide continuous pitch-correction algorithms executing on the respective device with performance-synchronized sequences of target notes in a current key or scale. In addition to performance-synchronized melody targets, score-coded harmony note sequences (or sets) provide pitch-shifting algorithms with additional targets (typically coded as offsets relative to a lead melody note track and typically scored only for selected portions thereof) for pitch-shifting to harmony versions of the user's own captured vocals. In some cases, pitch correction settings may be characteristic of a particular artist such as the artist that performed vocals associated with the particular backing track.

In general, lyrics, melody and harmony track note sets and related timing and control information may be encapsulated in an appropriate container or object (e.g., in a Musical Instrument Digital Interface, MIDI, or Java Script Object Notation, json, type format) for supply together with the backing track(s). Using such information, devices 101A and 101B (as well as associated audiovisual displays and/or set-top box equipment, not specifically shown) may display lyrics and even visual cues related to target notes, harmonies and currently detected vocal pitch in correspondence with an audible performance of the backing track(s) so as to facilitate a karaoke-style vocal performance by a user. Thus, if an aspiring vocalist selects "When I Was Your Man" as popularized by Bruno Mars, your_man.json and your_man_.m4a may be downloaded from the content server (if not already available or cached based on prior download) and, in turn, used to provide background music, synchronized lyrics and, in some situations or embodiments, score-coded note tracks for continuous, real-time pitch-correction while the user sings. Optionally, at least for certain embodiments or genres, harmony note tracks may be score coded for harmony shifts to captured vocals. Typically, a captured pitch-corrected (possibly harmonized) vocal performance together with performance synchronized video is saved locally, on the handheld device or set-top box, as one or more audiovisual files and is subsequently compressed and encoded for communication (e.g., as guest mix 106 or group audiovisual performance mix 111 or constituent encodings thereof) to content server 110 as an MPEG-4 container file. MPEG-4 is one suitable standard for the coded representation and transmission of digital multimedia content for the Internet, mobile networks and advanced broadcast applications. Other suitable codecs, compression techniques, coding formats and/or containers may be employed if desired.

As will be appreciated by persons of skill in the art having benefit of the present disclosure, performances of multiple vocalists (including performance synchronized video) may be accreted and combined, such as to form a duet-style performance, glee club, or vocal jam session. In some embodiments of the present invention, social network constructs may at least partially supplant or inform host control of the pairings of geographically-distributed vocalists and/or formation of geographically-distributed virtual glee clubs. For example, relative to FIG. 4, individual vocalists may perform as current host and guest users in a manner captured (with vocal audio and performance synchronized video) and eventually streamed as a live stream 122 to an audience. Such captured audiovisual content may, in turn, be distributed to social media contacts of the vocalist, members of the audience etc., via an open call mediated by the content server. In this way, the vocalists themselves, members of the audience (and/or the content server or service platform on their behalf) may invite others to join in a coordinated audiovisual performance, or as members of an audience or guest queue.

Figure 5:
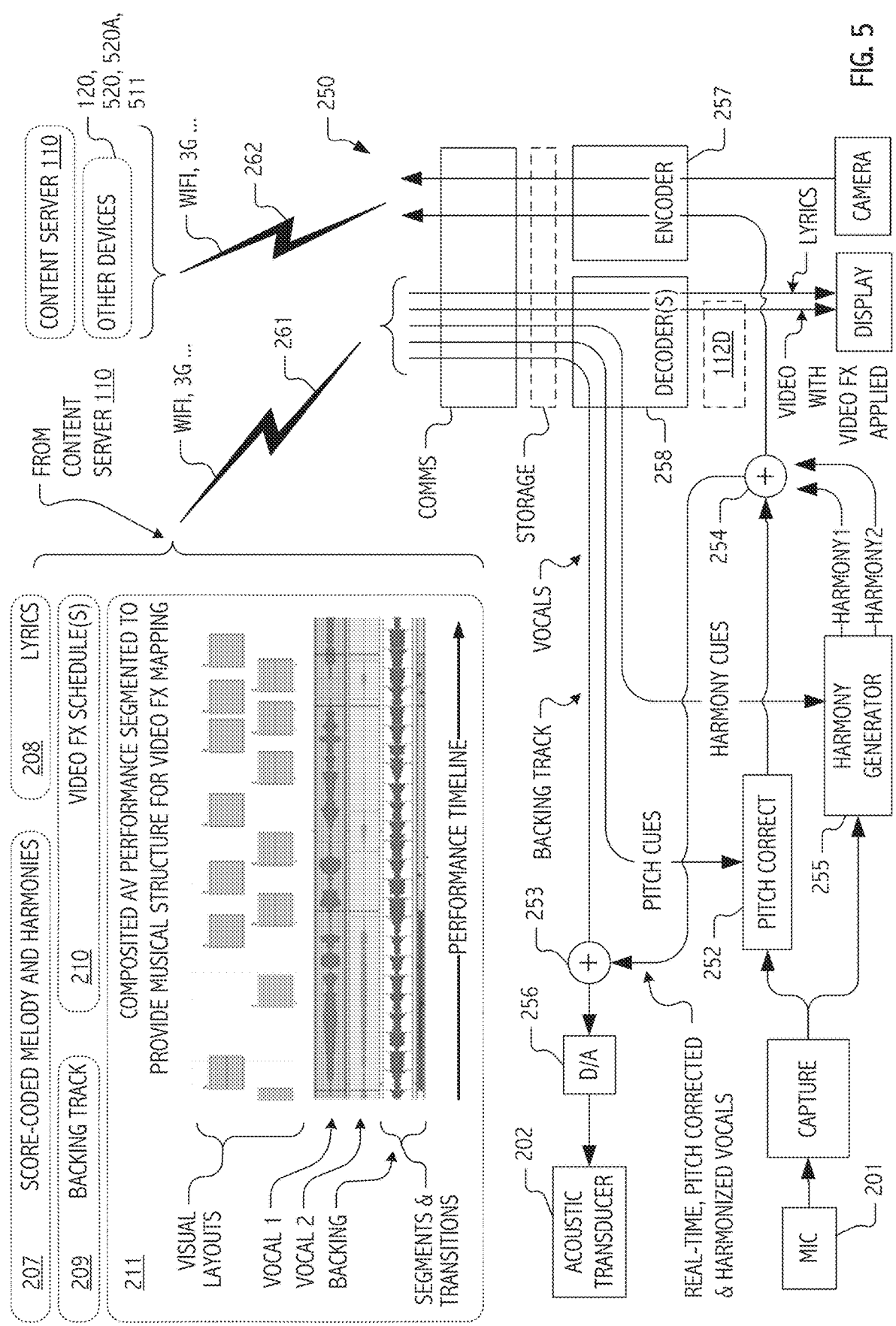
FIG. 5 is a flow diagram illustrating information transfers that contribute to or involve a composited audiovisual performance segmented to provide musical structure for video effects mapping in accordance with some embodiments of the present invention(s).

FIG. 5 is a flow diagram illustrating information transfers that contribute to or involve a composited audiovisual performance 211 segmented to provide musical structure for video effects mapping in accordance with some embodiments of the present invention(s). Video effects schedule 210 specifies for respective segmented elements of the musical structure, particular visual layouts and mood-denominated visual effects such a particle based effects, transitions between video sources, animations of frame motion, vector graphics/images of patterns/textures and/or color/saturation/contrast. In general, intensity of applied video effects is determined based on an intensity measure from the captured audiovisual performance (typically vocal intensity), although energy density of one or more audio tracks, including a backing track, may be included in some cases or embodiments.

In the illustrated configuration of signal processing pipelines that may be implemented at a user device such as handheld 101, 101A or 1018, a user/vocalist sings along with a backing track karaoke style. Vocals captured from a microphone input 201 are continuously pitch-corrected (252) and harmonized (255) in real-time for mix (253) with the backing track which is audibly rendered at one or more acoustic transducers 202.

Both pitch correction and added harmonies are chosen to correspond to pitch tracks 207 of a musical score, which in the illustrated configuration, is wirelessly communicated (261) to the device(s) (e.g., from content server 110 to handheld 101 or set-top box equipment, recall FIG. 1) on which vocal capture and pitch-correction is to be performed, together with lyrics 208 and an audio encoding of the backing track 209.

In the computational flow of FIG. 5, pitch corrected or shifted vocals may be combined (254) or aggregated for mix (253) with an audibly-rendered backing track and/or communicated (262) to content server 110 or a remote device (e.g., handheld 120 or 520, television and/or set-top box equipment, or some other media-capable, computational system 511). In some embodiments, pitch correction or shifting of vocals and/or segmentation of audiovisual performances may be performed at content server 110.

As before, persons of skill in the art having benefit of the present disclosure, will appreciate that instances of segmentation and VFX engine functionality such as previously described (recall FIG. 1, segmentation and VFX engine 112) may, in other embodiments, be deployed at a handheld 101, audiovisual and/or set-top box equipment, or other user device. Accordingly, descriptions of segmentation and VFX engine 112 relative to FIGS. 3A, 3B and 3C will be understood to analogously describe implementations of similar functionality 112D relative to signal processing pipelines of FIG. 5.

Figure 6:
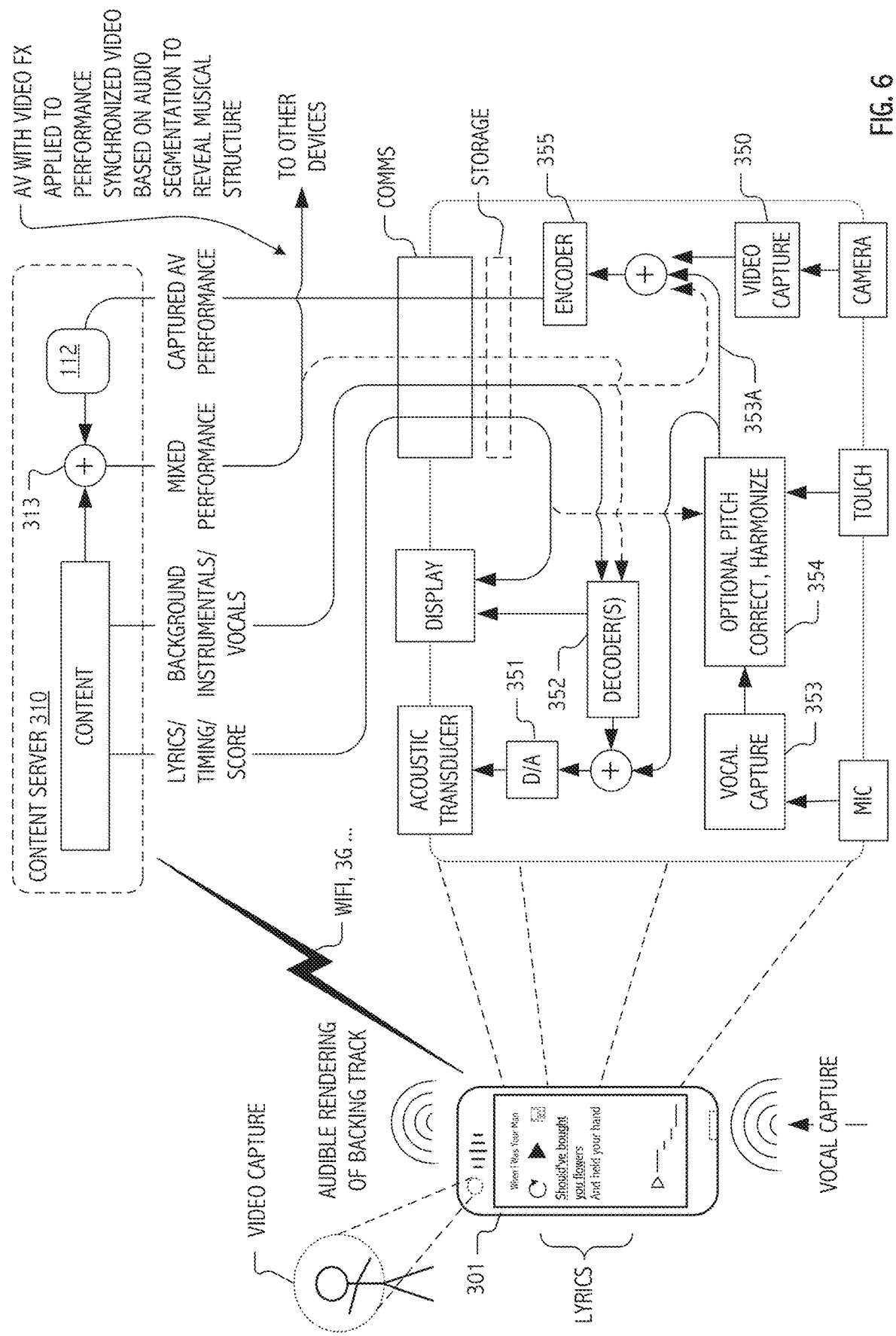
FIG. 6 is a functional block diagram of hardware and software components executable at an illustrative mobile phone-type portable computing device to facilitate processing of a captured audiovisual performance in accordance with some embodiments of the present invention(s).

FIG. 6 is a functional block diagram of hardware and software components executable at an illustrative mobile phone-type portable computing device to facilitate processing of a captured audiovisual performance in accordance with some embodiments of the present invention(s). In some embodiments (recall FIG. 1), capture of vocal audio and performance synchronized video may be performed using facilities of television-type display and/or set-top box equipment. However, in other embodiments, a handheld device (e.g., handheld device 101) may itself support capture of both vocal audio and performance synchronized video.

Thus, FIG. 6 illustrates basic signal processing flows in accord with certain implementations suitable for mobile phone-type handheld device 101 to capture vocal audio and performance synchronized video, to generate pitch-corrected and optionally harmonized vocals for audible rendering (locally and/or at a remote target device), and to communicate with a content server or service platform 110 that includes segmentation and visual effects engine 112, whereby captured audiovisual performances are segmented to reveal musical structure and, based on the revealed musical structure, particular visual effects are applied from a video effects schedule. As before, vocal intensity is measured and utilized (in some embodiments) to vary or modulate intensity of mood-denominated visual effects.

Exemplary Visual Effects for Cohesion of Multiperformer Visuals

Figure 8A:
FIGS. 8A and 8B illustrate visuals for a group performance with and without use of a visual blur technique applied in accordance with some embodiments of the present invention(s).
Figure 8B:
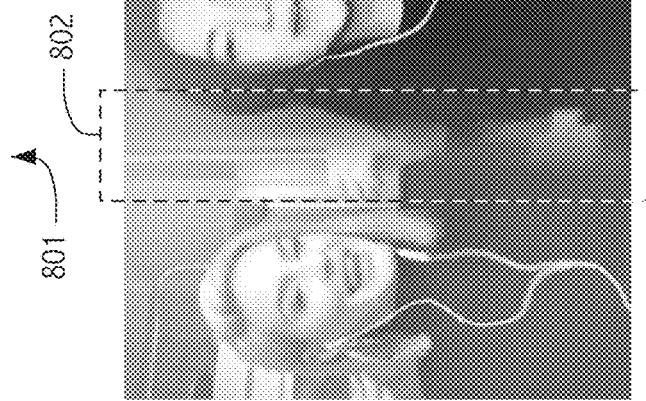
Figure 7:
FIG. 7 illustrates process steps and results of processing, in accordance with some embodiments of the present invention(s), to apply color correction and mood-denominated video effects to video for respective performers of a group performance separately captured using cameras of respective capture devices.

FIG. 7 illustrates process steps and results of processing, in accordance with some embodiments of the present invention(s), to apply color correction and mood-denominated video effects (see 701B, 702B) to video for respective performers (701A and 702A) of a group performance separately captured using cameras of respective capture devices. FIGS. 8A and 8B illustrate visuals for a group performance with (802) and without (801) use of a visual blur technique applied in accordance with some embodiments of the present invention(s).

An Exemplary Mobile Device and Network

Figure 9:
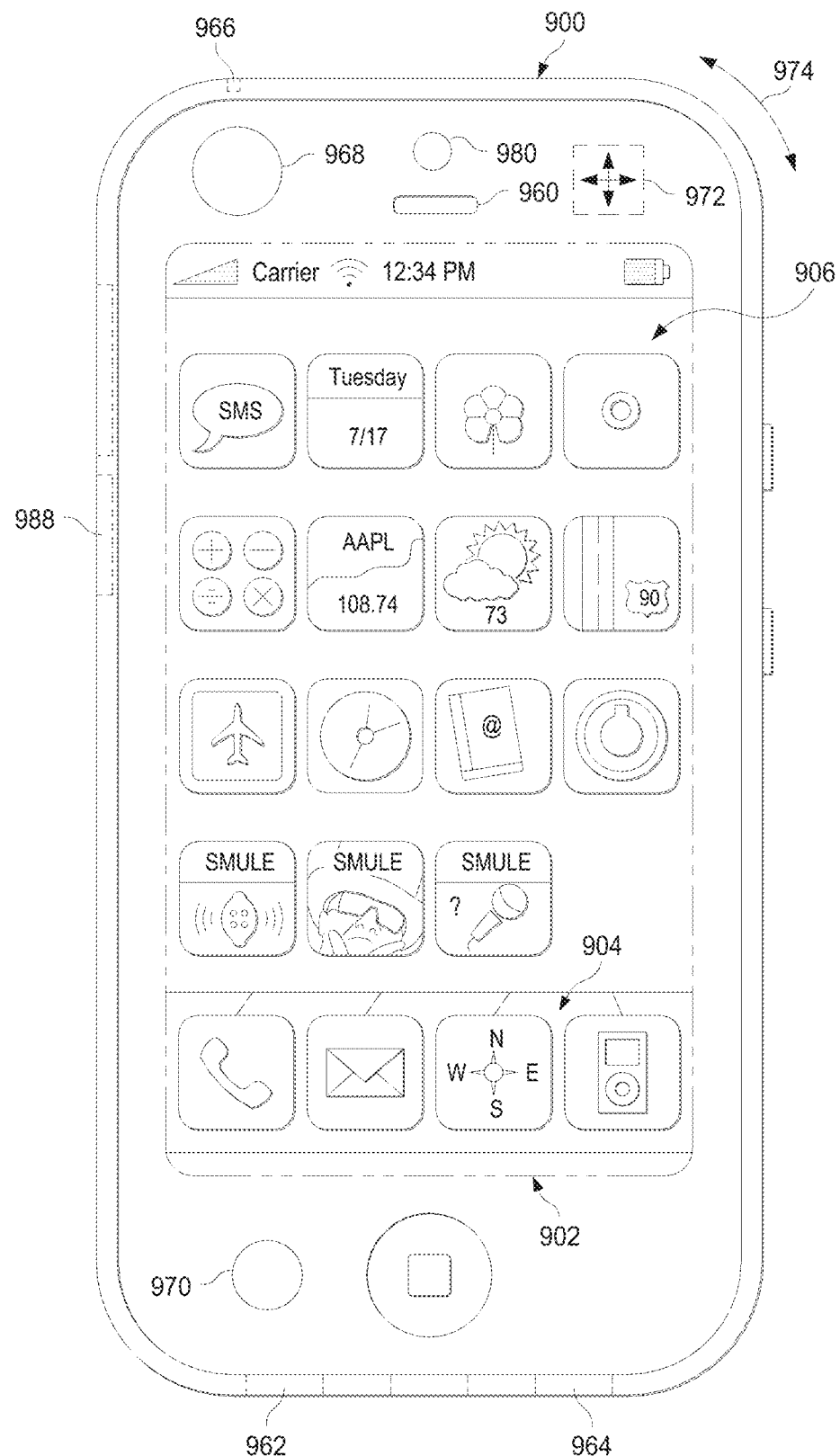
FIG. 9 illustrates features of a mobile device that may serve as a platform for execution of software implementations, including audiovisual capture, in accordance with some embodiments of the present invention(s).

FIG. 9 illustrates features of a mobile device that may serve as a platform for execution of software implementations, including audiovisual capture, in accordance with some embodiments of the present invention(s). In particular, FIG. 9 illustrates features of a mobile device that may serve as a platform for execution of software implementations in accordance with some embodiments of the present invention. More specifically, FIG. 9 is a block diagram of a mobile device 900 that is generally consistent with commercially-available versions of an iPhone™ mobile digital device. Although embodiments of the present invention are certainly not limited to iPhone deployments or applications (or even to iPhone-type devices), the iPhone device platform, together with its rich complement of sensors, multimedia facilities, application programmer interfaces and wireless application delivery model, provides a highly capable platform on which to deploy certain implementations. Based on the description herein, persons of ordinary skill in the art will appreciate a wide range of additional mobile device platforms that may be suitable (now or hereafter) for a given implementation or deployment of the inventive techniques described herein.

Summarizing briefly, mobile device 900 includes a display 902 that can be sensitive to haptic and/or tactile contact with a user. Touch-sensitive display 902 can support multi-touch features, processing multiple simultaneous touch points, including processing data related to the pressure, degree and/or position of each touch point. Such processing facilitates gestures and interactions with multiple fingers and other interactions. Of course, other touch-sensitive display technologies can also be used, e.g., a display in which contact is made using a stylus or other pointing device.

Typically, mobile device 900 presents a graphical user interface on the touch-sensitive display 902, providing the user access to various system objects and for conveying information. In some implementations, the graphical user interface can include one or more display objects 904, 906. In the example shown, the display objects 904, 906, are graphic representations of system objects. Examples of system objects include device functions, applications, windows, files, alerts, events, or other identifiable system objects. In some embodiments of the present invention, applications, when executed, provide at least some of the digital acoustic functionality described herein.

Typically, the mobile device 900 supports network connectivity including, for example, both mobile radio and wireless internetworking functionality to enable the user to travel with the mobile device 900 and its associated network-enabled functions. In some cases, the mobile device 900 can interact with other devices in the vicinity (e.g., via Wi-Fi, Bluetooth, etc.). For example, mobile device 900 can be configured to interact with peers or a base station for one or more devices. As such, mobile device 900 may grant or deny network access to other wireless devices.

Mobile device 900 includes a variety of input/output (I/O) devices, sensors and transducers. For example, a speaker 960 and a microphone 962 are typically included to facilitate audio, such as the capture of vocal performances and audible rendering of backing tracks and mixed pitch-corrected vocal performances as described elsewhere herein. In some embodiments of the present invention, speaker 960 and microphone 962 may provide appropriate transducers for techniques described herein. An external speaker port 964 can be included to facilitate hands-free voice functionalities, such as speaker phone functions. An audio jack 966 can also be included for use of headphones and/or a microphone. In some embodiments, an external speaker and/or microphone may be used as a transducer for the techniques described herein.

Other sensors can also be used or provided. A proximity sensor 968 can be included to facilitate the detection of user positioning of mobile device 900. In some implementations, an ambient light sensor 970 can be utilized to facilitate adjusting brightness of the touch-sensitive display 902. An accelerometer 972 can be utilized to detect movement of mobile device 900, as indicated by the directional arrow 974. Accordingly, display objects and/or media can be presented according to a detected orientation, e.g., portrait or landscape. In some implementations, mobile device 900 may include circuitry and sensors for supporting a location determining capability, such as that provided by the global positioning system (GPS) or other positioning systems (e.g., systems using Wi-Fi access points, television signals, cellular grids, Uniform Resource Locators (URLs)) to facilitate geocodings described herein. Mobile device 900 also includes a camera lens and imaging sensor 980. In some implementations, instances of a camera lens and sensor 980 are located on front and back surfaces of the mobile device 900. The cameras allow capture still images and/or video for association with captured pitch-corrected vocals.

Mobile device 900 can also include one or more wireless communication subsystems, such as an 802.11b/g/n/ac communication device, and/or a Bluetooth™ communication device 988. Other communication protocols can also be supported, including other 802.x communication protocols (e.g., WiMax, Wi-Fi, 3G), fourth generation protocols and modulations (4G-LTE) and beyond (e.g., 5G), code division multiple access (CDMA), global system for mobile communications (GSM), Enhanced Data GSM Environment (EDGE), etc. A port device 990, e.g., a Universal Serial Bus (USB) port, or a docking port, or some other wired port connection, can be included and used to establish a wired connection to other computing devices, such as other communication devices 900, network access devices, a personal computer, a printer, or other processing devices capable of receiving and/or transmitting data. Port device 990 may also allow mobile device 900 to synchronize with a host device using one or more protocols, such as, for example, the TCP/IP, HTTP, UDP and any other known protocol.

FIG. 10 is a network diagram that illustrates cooperation of exemplary devices in accordance with some embodiments of the present invention(s). In particular, FIG. 10 illustrates respective instances of handheld devices or portable computing devices such as mobile device 1001 employed in audiovisual capture and programmed with vocal audio and video capture code, user interface code, pitch correction code, an audio rendering pipeline and playback code in accord with the functional descriptions herein. A first device instance is depicted as, for example, employed in a vocal audio and performance synchronized video capture, while device instance 1020A operates in a presentation or playback mode for a mixed audiovisual performance with dynamic visual prominence for performance synchronized video. An additional television-type display and/or set-top box equipment 1020B is likewise depicted operating in a presentation or playback mode, although as described elsewhere herein, such equipment may also operate as part of a vocal audio and performance synchronized video capture facility. Each of the aforementioned devices communicate via wireless data transport and/or intervening networks 1004 with a server 1012 or service platform that hosts storage and/or functionality explained herein with regard to content server 110 (recall FIGS. 1, 4, 5 and 6). Captured, pitch-corrected vocal performances with performance synchronized video mixed to present mixed AV performance rendering with applied visual effects as described herein may (optionally) be streamed and audiovisually rendered at laptop computer 1011.

Other Embodiments

While the invention(s) is (are) described with reference to various embodiments, it will be understood that these embodiments are illustrative and that the scope of the invention(s) is not limited to them. Many variations, modifications, additions, and improvements are possible. For example, while particular video effects, transitions and audiovisual mixing techniques are illustrated and described, persons of skill in the art having benefit of the present disclosure will appreciate number variations and adaptions suitable for a given deployment, implementation, musical genre or user demographic. Likewise, while pitch correction vocal performances captured in accord with a karaoke-style interface have been described, other variations and adaptations will be appreciated. Furthermore, while certain illustrative signal processing techniques have been described in the context of certain illustrative applications and device/system configurations, persons of ordinary skill in the art will recognize that it is straightforward to modify the described techniques to accommodate other suitable signal processing techniques and effects.

Embodiments in accordance with the present invention may take the form of, and/or be provided as, a computer program product encoded in a machine-readable medium as instruction sequences and other functional constructs of software, which may in turn be executed in a computational system (such as a iPhone handheld, mobile or portable computing device, or content server platform) to perform methods described herein. In general, a machine readable medium can include tangible articles that encode information in a form (e.g., as applications, source or object code, functionally descriptive information, etc.) readable by a machine (e.g., a computer, computational facilities of a mobile device or portable computing device, etc.) as well as tangible storage incident to transmission of the information. A machine-readable medium may include, but is not limited to, magnetic storage medium (e.g., disks and/or tape storage); optical storage medium (e.g., CD-ROM, DVD, etc.); magneto-optical storage medium; read only memory (ROM); random access memory (RAM); erasable programmable memory (e.g., EPROM and EEPROM); flash memory; or other types of medium suitable for storing electronic instructions, operation sequences, functionally descriptive information encodings, etc.

In general, plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method comprising:
accessing a machine readable encoding of a first audiovisual performance captured as vocal audio with performance synchronized video and having an associated musical structure encoding that includes at least musical section boundaries coded for temporal alignment with the first audiovisual performance encoding;
applying a first visual effect schedule to at least a portion of the first audiovisual performance encoding, wherein the applied visual effect schedule encodes differing visual effects for differing musical structure elements of the first audiovisual performance encoding and provides visual effect transitions in temporal alignment with at least some of the coded musical section boundaries.

2. The method of claim 1, further comprising:
segmenting at least an audio track of the first audiovisual performance encoding to provide the associated musical structure encoding.

3. The method of claim 1,
wherein the associated musical structure encoding includes group part or musical section metadata.

4. The method of claim 1,
wherein the differing visual effects differ in either degree or type or both degree and type.

5. The method of claim 1, further comprising:
selecting the first visual effect schedule from amongst a plurality of visual effect schedules.

6. The method of claim 5,
wherein the selecting is based on a computationally-determined mood for at least the captured vocal audio.

7. The method of claim 5,
wherein the selecting is based on a user interface selection by the vocal audio performer prior to, or coincident with, capture of the vocal audio.

8. The method of claim 5, further comprising:
selecting a second visual effect schedule from amongst the plurality of mood-denominated visual effect schedules, the second visual effect schedule differing from the first visual effect schedule; and
applying the second visual effect schedule to at least a portion of the first audiovisual performance encoding.

9. The method of claim 8, further comprising:
supplying an identification of the applied visual effect schedule for video effect rendering at one or more of the remote client devices.

10. The method of claim 5, further comprising:
streaming, to an audience at one or more remote client devices, the first audiovisual performance.

11. The method of claim 10,
wherein the streamed first audiovisual performance is mixed with an encoding of a backing track against which the vocal audio was captured.

12. The method of claim 10,
wherein the streamed first audiovisual performance is streamed with the first visual effect schedule applied.

13. The method of claim 5, further comprising:
to, from, or via a content server or service platform, transferring the first audiovisual performance together with at least an identifier for the one or more applied visual effect schedules.

14. The method of claim 5,
wherein the selecting is based on a user interface selection during, or prior to, audiovisual rendering of the first audiovisual performance.

15. The method of claim 14, further comprising:
after the audiovisual rendering of the first audiovisual performance, selecting a second visual effect schedule from amongst the plurality of mood-denominated visual effect schedules, the second visual effect schedule differing from the first visual effect schedule; and
applying the second visual effect schedule to at least a portion of the first audiovisual performance encoding.

16. The method of claim 5,
wherein for a particular mood-denominated visual effect schedule, mood values are parameterized as a two-dimensional quantity, wherein a first dimension of the mood parameterization codes an emotion and wherein second dimension of the mood parameterization codes intensity.

17. The method of claim 16, further comprising:
determining an intensity dimension of the mood parameterization based on one or more of: (i) a time-varying audio signal strength or vocal energy density measure computationally determined from the vocal audio and (ii) beats, tempo, signal strength or energy density of a backing audio track.

18. The method of claim 1, further comprising:
segmenting the first audiovisual performance encoding to identify the differing musical structure elements.

19. The method of claim 18,
wherein the segmenting is based at least in part on a computational determination of vocal intensity with at least some segmentation boundaries constrained to temporally align with beats or tempo computationally extracted from a corresponding audio backing track.

20. The method of claim 18,
wherein the segmenting is based at least in part on a similarity analysis computationally performed on a temporally-aligned lyrics track to classify particular portions of first audiovisual performance encoding as verse or chorus.

21. The method of claim 1, further comprising:
segmenting an audio backing track associated with the first audiovisual performance encoding to identify the differing musical structure elements.

22. The method of claim 1, wherein the differing visual effects encoded by the applied visual effect schedule include for a given element thereof, one or more of:
a particle-based effect or lens flare;
transitions between, or layouts of, distinct source videos;
animations or motion of a frame within a source video
vector graphics or images of patterns or textures; and
color, saturation or contrast.

23. The method of claim 1, wherein the differing visual effects encoded by the applied visual effect schedule include for a given element thereof, one or more of:
visual augmentation or ornamentation of a video image of a vocal performer's face, head or body; and
background subtraction.

24. The method of claim 1,
wherein the associated musical structure encodes musical sections of differing types; and
wherein the applied visual effect schedule defines differing visual effects for different ones of the encoded musical sections.

25. The method of claim 1,
wherein the associated musical structure encodes events or transitions; and
wherein the applied visual effect schedule defines differing visual effects for different ones of the encoded events or transitions.

26. The method of claim 1, wherein the machine readable encoding further encodes at least part of a second audiovisual performance captured as second vocal audio with performance synchronized video, the first and second audiovisual performances constituting a group performance.

27. The method of claim 26,
wherein the associated musical structure encodes group parts, and
wherein the applied visual effect schedule is temporally selective for particular performance synchronized video in correspondence with the encoded musical structure.

28. The method of claim 26,
wherein the first and second audiovisual performances present as a duet.

29. The method of claim 26,
wherein the applied visual effect schedule codes, for at least some musical structure elements, color matching of performance synchronized video for respective performers in the group performance.

30. The method of claim 26,
wherein the applied visual effect schedule codes, for at least some musical structure elements, a visual blur or blend at an interface between performance synchronized video for respective performers in the group performance.

31. The method of claim 26,
wherein the first and second audiovisual performances are captured against a common backing track.

32. The method of claim 1, further comprising:
capturing the first audiovisual performance at a network-connected vocal capture device communicatively coupled to a content server or service platform from which the musical structure encoding is supplied.

33. The method of claim 32,
wherein the audiovisual performance capture is performed at the network-connected vocal capture device in accordance with a Karaoke-style operational mechanic in which lyrics are visually presented in correspondence with audible rendering of a backing track.

34. The method of claim 1,
performed, at least in part, on a content server or service platform to which geographically-distributed, network-connected, vocal capture devices are communicatively coupled.

35. The method of claim 1,
performed, at least in part, on a network-connected, vocal capture device communicatively coupled to a content server or service platform.

36. The method of claim 1,
embodied, at least in part, as a computer program product encoding of instructions executable on a content server or service platform to which a plurality of geographically-distributed, network-connected, vocal capture devices are communicatively coupled.

37. A system comprising:
a geographically distributed set of network-connected devices configured to capture audiovisual performances including vocal audio with performance synchronized video; and
a service platform configured to (i) receive encodings of the captured audiovisual performances and, in correspondence with associated musical structure encodings that include at least musical section boundaries coded for temporal alignment with the audiovisual performance encodings, to (ii) apply particular visual effect schedules to at least a portion of the audiovisual performance encodings,
wherein the applied visual effect schedules encode differing visual effects for differing musical structure elements of the audiovisual performance encodings and provide visual effect transitions in temporal alignment with at least some of the coded musical section boundaries.

38. The system of claim 37,
wherein the service platform is configured to, responsive to user or performer selections, change the applied visual effect schedules and supply resulting captured audiovisual performances to respective ones of the geographically distributed network-connected devices for audiovisual rendering thereon.

39. The system of claim 38,
wherein the applied visual effect schedules are selected from amongst a plurality of visual effect schedules.

40. A system comprising:
at least a guest and host pairing of network-connected devices configured to capture at least vocal audio; and
the host device configured to (i) receive from the guest device an encoding of a respective encoding of at least vocal audio and, in correspondence with an associated musical structure encoding that includes at least musical section boundaries coded for temporal alignment with an audiovisual performance encoding, to (ii) apply a selected visual effect schedules to the audiovisual performance encoding,
wherein the applied visual effect schedules encode differing visual effects for differing musical structure elements of the audiovisual performance encoding and provide visual effect transitions in temporal alignment with at least some of the coded musical section boundaries.

41. The system of claim 40,
the host and guest devices coupled as local and remote peers via communication network with non-negligible peer-to-peer latency for transmissions of audiovisual content, the host device communicatively coupled as the local peer to receive a media encoding of a mixed audio performance constituting vocal audio captured at the guest device, and the guest device communicatively coupled as the remote peer to supply the media encoding captured from a first one of the performers and mixed with a backing audio track.

42. The system of claim 40,
wherein associated musical structure encoding is computationally determined at the host device based on segmenting at least an audio track received from the guest device.

43. The system of claim 40,
the host device configured to render the audiovisual performance coding as a mixed audiovisual performance, including vocal audio and performance synchronized video from the first and a second one of the performers, and transmit the audiovisual performance coding as an apparently live broadcast with the selected visual effect schedule applied.

* * * * *